United States Patent
Han et al.

(10) Patent No.: US 10,916,249 B2
(45) Date of Patent: Feb. 9, 2021

(54) METHOD OF PROCESSING A SPEECH SIGNAL FOR SPEAKER RECOGNITION AND ELECTRONIC APPARATUS IMPLEMENTING SAME

(71) Applicant: SAMSUNG ELECTRONICS CO., LTD., Suwon-si (KR)

(72) Inventors: Youngho Han, Suwon-si (KR); Keunseok Cho, Suwon-si (KR); Jaeyoung Roh, Suwon-si (KR); Namhoon Kim, Suwon-si (KR); Chiyoun Park, Suwon-si (KR); Jongyoub Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 16/265,237

(22) Filed: Feb. 1, 2019

(65) Prior Publication Data

US 2019/0244612 A1 Aug. 8, 2019

(30) Foreign Application Priority Data

Feb. 2, 2018 (KR) .................. 10-2018-0013430

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/187* (2013.01); *G10L 17/02* (2013.01);
(Continued)

(58) Field of Classification Search
CPC ......... G10L 15/22; G10L 17/02; G10L 17/24; G10L 15/02; G10L 15/187; G10L 25/84; G10L 2015/025
See application file for complete search history.

(56) References Cited

U.S. PATENT DOCUMENTS

2012/0130714 A1* 5/2012 Zeljkovic ................ G10L 17/04
704/235
2012/0221336 A1* 8/2012 Degani ................... G10L 17/26
704/250
(Continued)

FOREIGN PATENT DOCUMENTS

| KR | 10-1998-045013 A | 9/1998 |
| KR | 10-2001-0037652 A | 5/2001 |
| KR | 10-2010-0021204 A | 2/2010 |

OTHER PUBLICATIONS

Communication dated May 17, 2019 issued by the International Searching Authority in Counterpart Application No. PCT/KR2019/001372 (PCT/ISA/220, PCT/ISA/210, and PCT/ISA/237).

*Primary Examiner* — Stella L. Woo
(74) *Attorney, Agent, or Firm* — Sughrue Mion, PLLC

(57) ABSTRACT

A method of processing a speech signal for speaker recognition in an electronic apparatus includes: obtaining a speech signal of a first user; extracting a speech feature comprising a feature value from the speech signal; comparing the speech feature extracted from the speech signal of the first user with a predetermined reference value; selecting a first user feature that corresponds to the speech feature of the first user compared with the reference value; generating a recommended phrase used for speaker recognition based on the first user feature; and outputting the recommended phrase.

18 Claims, 18 Drawing Sheets

(51) Int. Cl.
*G10L 15/187* (2013.01)
*G10L 25/84* (2013.01)
*G10L 17/02* (2013.01)
*G10L 17/24* (2013.01)

(52) U.S. Cl.
CPC .............. *G10L 17/24* (2013.01); *G10L 25/84* (2013.01); *G10L 2015/025* (2013.01)

(56) References Cited

U.S. PATENT DOCUMENTS

| | | |
|---|---|---|
| 2016/0035350 A1 | 2/2016 | Jung et al. |
| 2016/0203821 A1 | 7/2016 | Zeljkovic et al. |
| 2016/0248768 A1 | 8/2016 | McLaren et al. |
| 2017/0287487 A1 | 10/2017 | Sharifi et al. |
| 2018/0040325 A1* | 2/2018 | Melanson ............... G10L 17/24 |
| 2018/0277132 A1* | 9/2018 | LeVoit .................... G10L 15/02 |

* cited by examiner

METHOD OF PROCESSING A SPEECH SIGNAL FOR SPEAKER RECOGNITION AND ELECTRONIC APPARATUS IMPLEMENTING SAME

CROSS-REFERENCE TO RELATED APPLICATION

This application is based on and claims priority under 35 U.S.C. § 119 to Korean Patent Application No. 10-2018-0013430, filed on Feb. 2, 2018, in the Korean Intellectual Property Office, the disclosure of which is incorporated by reference herein in its entirety.

BACKGROUND

1. Field

The disclosure relates to methods of processing speech signals to perform speaker recognition based on received speech signals and electronic apparatuses performing the methods.

2. Description of Related Art

As electronic apparatuses, such as smartphones, that perform various functions have recently been developed, electronic apparatuses having speech recognition functions to improve operability have been introduced. Speech recognition functions allow apparatuses to be easily controlled by recognizing speech from users without the users pressing buttons or touching touch modules. That is, speech interaction with an electronic device can be more convenient than physically touching a user interface in some circumstances.

Due to speech recognition functions, electronic devices such as smartphones may perform voice calls and text messaging without users pressing buttons, and may also perform various functions such as a navigation function, an Internet search function, and an alarm setting function.

As speech recognition technology has advanced, electronic apparatuses having speaker recognition functions using speech recognition technology have been introduced. In detail, electronic apparatuses that perform speaker recognition based on a received speech signal and perform a subsequent operation, for example, an operation of allowing or limiting the use of the electronic apparatuses, or determining whether to perform subsequent speech recognition, based on a result of the speaker recognition, have been developed.

An electronic apparatus, e.g., a mobile phone, in which privacy protection of a user is important, needs to be used only by the user who is the owner of the mobile phone. That is, unauthorized use by non-owners should be prevented. In this case, the mobile phone has to perform speaker recognition in order to determine whether a speaker who inputs a speech signal is a registered user.

As another example, an electronic apparatus that provides personalized services according to users requires speaker recognition. In detail, such an electronic apparatus may identify a user by performing speaker recognition and may provide a personalized service specific to that user according to a result of the identification.

Although speaker recognition technology has rapidly advanced, speaker recognition accuracy of electronic apparatuses is still not high when a plurality of speech signals respectively corresponding to a plurality of speakers having similar speech features need to be distinguished from one another. Also, speaker recognition accuracy may be reduced due to noise generated in an environment where the speakers speak.

Accordingly, there is a need to develop a method and an apparatus for improving speaker recognition accuracy in various surrounding environments and/or operating environments.

SUMMARY

A method of processing a speech signal and an electronic apparatus implementing the same method according to an embodiment of the disclosure may improve speaker recognition accuracy based on a received speech signal.

In detail, a method of processing a speech signal and an electronic apparatus thereof according to an embodiment of the disclosure may improve speaker recognition accuracy based on a received speech signal by extracting a speech feature compared with a reference value from among speech features of a speaker who utters and suggesting recommended text based on the extracted speech feature.

In detail, a method of processing a speech signal and an electronic apparatus thereof according to an embodiment of the disclosure may improve, when speaker recognition is performed on a plurality of speakers having similar speech features, speaker recognition performance based on speech uttered by one speaker from among the plurality of speakers having similar speech features.

Also, a method of processing a speech signal and an electronic apparatus thereof according to an embodiment of the disclosure may overcome a reduction in a speaker recognition rate, e.g., speaker recognition accuracy, due to a noise signal generated when a speech signal is received for speaker recognition.

In detail, a method of processing a speech signal and an electronic apparatus thereof according to an embodiment of the disclosure may improve speaker recognition performance by adaptively responding to a change in an operating environment and a noise environment where speaker recognition is performed and adjusting at least one of a reference value or a threshold value used for speaker recognition.

Additional aspects will be set forth in part in the description which follows and, in part, will be apparent from the description, or may be learned by practice of the presented embodiments of the disclosure.

In accordance with an aspect of the disclosure, a method of processing a speech signal for speaker recognition in an electronic apparatus may comprise: obtaining a speech signal of a first user; extracting a speech feature comprising a feature value from the speech signal; comparing the speech feature comprising the feature value extracted from the speech signal of the first user with a predetermined reference value; selecting a first user feature that corresponds to the speech feature of the first user compared with the predetermined reference value; generating a recommended phrase used for speaker recognition based on the first user feature; and outputting the recommended phrase.

The comparing the speech feature may comprise comparing each of a plurality of unit sound features extracted in a predetermined unit from the speech signal of the first user with corresponding predetermined reference values, and the selecting may comprise, based on a result of the comparing, selecting, as the first user feature, at least one unit sound feature that is extracted from the speech signal of the first user that differs from a corresponding predetermined reference value by a predetermined amount or more.

The comparing may comprise comparing each of a plurality of unit sound features extracted in a predetermined unit from the speech signal of the first user with corresponding predetermined reference values; and the selecting may comprise, based on a result of the comparing, selecting, as the first user feature, at least one unit sound feature that is extracted from the speech signal of the first user and whose similarity to the corresponding predetermined reference value is lower than a predetermined percentage.

The speech feature may be extracted in a predetermined unit, and the predetermined unit may be a phoneme context, and the generating of the recommended phrase may comprise generating the recommended phrase so that letters comprising at least one phoneme context included in the first user feature are included in the recommended phrase.

The receiving may include receiving the recommended phrase from the first user; and receiving the recommended phrase as a registered speech signal and performing speaker recognition by using the registered speech signal.

The predetermined reference value may be a value representing an average speech feature of a plurality of users in a phoneme context unit.

The electronic apparatus may be commonly used by a plurality of users including the first user, and the predetermined reference value may be a value representing a speech feature extracted from a speech signal of a second user included in the plurality of users.

The selecting of the first user feature may comprise performing a comparison to compare a speech feature of a phoneme context unit extracted from the speech signal of the first user with a speech feature of a phoneme context unit extracted from the speech signal of the second user, and extracting, as the first user feature, at least one phoneme context whose difference between the speech feature of the first user and the speech feature of the second user exceeds a predetermined range as a result of the comparison.

The method may further comprise calculating a similarity between the speech feature of the first user and the speech feature of the second user; and modifying at least one of: the speech feature of the first user, the speech feature of the second user, a model used to recognize the speech signal of the first user, or a model used to recognize the speech signal of the second user, in order to increase discrimination power in recognizing speech of the first user and speech of the second user.

The obtaining of the speech signal of the first user may comprise receiving the speech signal uttered by the first user and a noise signal generated in an environment where the first user utters the speech signal, and the method may further comprise: extracting a noise feature that is a feature of the noise signal; adjusting at least one of a threshold value applied to perform speaker recognition or a weight value applied to a predetermined unit sound included in the speech signal of the first user, based on the noise feature; and performing speaker recognition based on the adjusted at least one of the threshold value or the weight value.

The obtaining of the speech signal of the first user may comprise: receiving the speech signal uttered by the first user and a noise signal generated in an environment where the first user utters the speech signal, wherein the method further comprises: extracting a signal feature of the noise signal; and adjusting a speaker recognition model so that the speech signal to be recognized is not masked by the noise signal, based on a noise feature that is a feature of the noise signal.

In accordance with another aspect of the disclosure, an electronic apparatus for processing a speech signal to perform speaker recognition is provided, and the electronic apparatus may comprise: a receiver configured to obtain a speech signal of a first user; a controller configured to: extract a speech feature comprising a feature value from the speech signal, compare the speech feature including the feature value extracted from the speech signal of the first user with a predetermined reference value, selecting a first user feature that corresponds to the speech feature of the first user compared with the reference value, and generate a recommended phrase used for speaker recognition based on the first user feature; and an outputter configured to output the recommended phrase.

The controller may be further configured to: compare each of a plurality of unit sound features extracted in a predetermined unit from the speech signal of the first user with corresponding predetermined reference values; and select, as the first user feature, at least one unit sound feature that is extracted from the speech signal of the first user that differs from a corresponding predetermined reference value by a predetermined amount or more.

The controller may be further configured to: compare each of a plurality of unit sound features extracted in a predetermined unit from the speech signal of the first user with corresponding predetermined reference values, and extract, as the first user feature, at least one unit sound feature that is extracted from the speech signal of the first user and whose similarity to the corresponding reference value is lower than a predetermined percentage.

When the speech feature is extracted in the predetermined unit, the predetermined unit may be a phoneme context, and the controller may be further configured to generate the recommended phrase so that letters comprising at least one phoneme context included in the first user feature are included in the recommended phrase.

The predetermined reference value may be a value representing an average speech feature of a plurality of users in a phoneme context unit.

The electronic apparatus may be configured to perform speaker recognition on a plurality of users comprising the first user, and wherein the predetermined reference value is a value representing a speech feature extracted from a speech signal of a second user included in the plurality of users.

The controller may be further configured to: perform a comparison to compare a speech feature of a phoneme context unit extracted from the speech signal of the first user with a speech feature of a phoneme context unit extracted from the speech signal of the second user, and extract, as the first user feature, at least one phoneme context whose difference between the speech feature of the first user and the speech feature of the second user exceeds a predetermined range as a result of the comparison.

The receiver may be further configured to receive the speech signal uttered by the first user and a noise signal generated in an environment where the first user utters the speech signal, wherein the controller is further configured to extract a signal feature of the noise signal, adjust at least one of a threshold value applied to perform speaker recognition or a weight value applied to a predetermined unit sound included in the speech signal of the first user based on the signal feature of the noise signal, and perform speaker recognition based on the adjusted at least one of the threshold value or the weight value.

In accordance with another aspect of the disclosure, anon-transitory computer-readable recording medium may have embodied thereon a program comprising computer-executable instructions for performing a method of processing a speech signal for speaker recognition in an electronic apparatus, the method comprising: obtaining a speech signal of a first user; extracting a speech feature comprising a feature value from the speech signal; comparing the speech feature including the feature value extracted from the speech signal of the first user with a predetermined reference value; select a first user feature that corresponds to the speech feature of the first user compared with the reference value; generating a recommended phrase used for speaker recognition based on the first user feature; and outputting the recommended phrase.

In accordance with another aspect of the disclosure, a method of processing a speech signal for speaker recognition in an electronic apparatus, may comprise: obtaining a speech signal of a first user; extracting plural speech features from the speech signal, each speech feature comprising a feature value; comparing each feature value extracted from the speech signal of the first user with predetermined reference values; selecting a first user feature of the plural speech features that differs from a corresponding predetermined reference value by a predetermined amount or more; generating a recommended phrase used for speaker recognition based on the first user feature; and outputting the recommended phrase via a display or speaker.

The method may further comprise selecting a second user feature that differs from a corresponding predetermined reference value by a predetermined amount or more; and the generating the recommend phrase is based on the first user feature and the second user feature.

The method may further comprise, wherein the first user feature is a single phoneme, and the recommended phrase includes the single phoneme.

The method may further comprise, wherein the first user feature is a phoneme context, and the recommended phrase includes the phoneme context.

The method may further comprise, wherein the first user feature is a tri-phoneme, and the recommended phrase includes the tri-phoneme.

The method may further comprise, wherein the comparing comprises calculating a similarity percentage of each of the feature values with respect to the predetermined reference values.

The method may further comprise receiving the recommended phrase from the first user, and identifying the first user based on the received recommended phrase.

The method may further comprise, wherein the predetermined references values are average speech features of a plurality of users.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
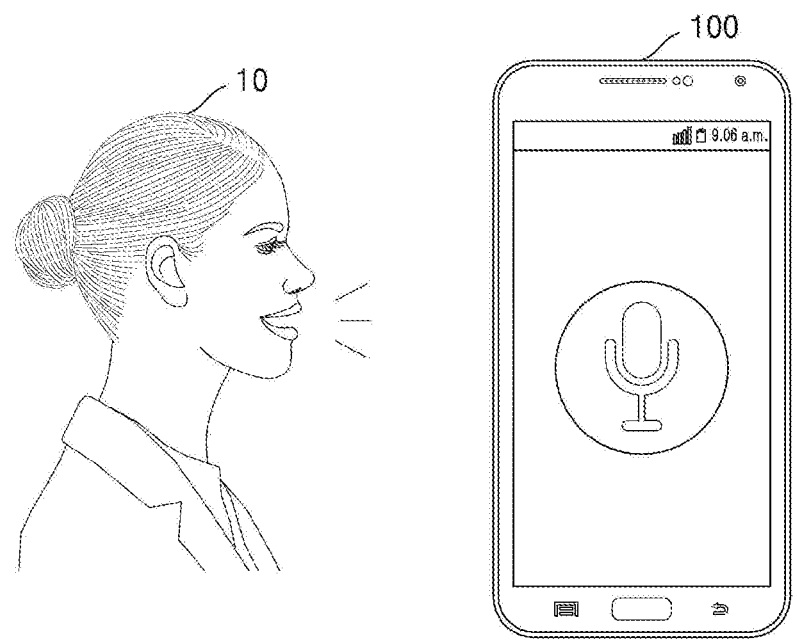
FIG. 1A is a view for describing an electronic apparatus according to an embodiment of the disclosure that performs speaker recognition.

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The phrases "in some embodiments of the disclosure" or "in an embodiment of the disclosure" throughout this specification do not necessarily all refer to the same embodiment.

Some embodiments of the disclosure may be described in terms of functional block components and various processing steps. Some or all of functional blocks may be realized by any number of hardware and/or software components configured to perform specified functions. For example, the functional blocks of the disclosure may be realized by one or more processors or microprocessors, or circuit components for a predetermined function. Furthermore, for example, the functional blocks of the disclosure may be implemented with any programming or scripting language. The functional blocks may be implemented in algorithms that are executed on one or more processors. Also, the disclosure could employ existing techniques for electronics configuration, signal processing and/or data processing. The terms "module" and "configuration" may be used broadly and are not limited to mechanical or physical elements.

Furthermore, the connecting lines or connectors between elements shown in the various figures are intended to represent exemplary functional relationships and/or physical or logical couplings between the elements. It should be noted that many alternative or additional functional relationships, physical connections, or logical connections may be present in a practical device.

As used herein, the term "and/or" includes any and all combinations of one or more of the associated listed items. Expressions such as "at least one of", when preceding a list of elements, modify the entire list of elements and do not modify the individual elements of the list.

Throughout the disclosure, the expression "at least one of a, b or c" indicates only a, only b, only c, both a and b, both a and c, both b and c, all of a, b, and c, or variations thereof.

The disclosure will now be described more fully with reference to the accompanying drawings, in which embodiments of the disclosure are shown.

An embodiment of the disclosure relates to a method and an apparatus that perform speaker recognition based on a speech signal.

In an embodiment of the disclosure, an audio signal may be received, and speaker registration and speaker recognition may be performed based on the received audio signal. The audio signal may include a speech signal uttered by a speaker. Also, the received audio signal may include both a speech signal uttered by a speaker and a noise signal generated in an environment where the speaker speaks.

Speech recognition and speaker registration may be performed based on the received audio signal, and the speaker recognition may be performed based on the speech signal received after the speaker registration is completed.

An electronic apparatus according to an embodiment of the disclosure may be any electronic apparatus that may perform speaker recognition based on an audio signal. In detail, the electronic apparatus according to an embodiment of the disclosure may perform a speaker recognition function by receiving an audio signal including speech of a person and recognizing the audio signal. The term 'speaker recognition function' refers to a function of performing an operation of performing speaker registration based on a recognized speech signal, determining whether a speaker is a registered speaker based on the recognized speech signal, or determining whether to perform a subsequent operation based on a result of the determination.

In detail, an electronic apparatus according to an embodiment of the disclosure may be a mobile computing device or a non-mobile computing device such as, but not limited to, a wearable device, a smartphone, a tablet personal computer (PC), a PC, a personal digital assistant (PDA), a laptop computer, a smart speaker, a media player, a micro-server, a global positioning system (GPS) device, an electronic book terminal, a digital broadcasting terminal, a navigation device, a kiosk, an MP3 player, a digital camera, an electronic control unit of a vehicle, or a central information display (CID). Also, the electronic apparatus according to an embodiment of the disclosure may be a home appliance, which is controllable by a home Internet of Things (IoT) platform, such as a TV, a washing machine, a refrigerator, a microwave oven, or a computer.

In detail, an electronic apparatus according to an embodiment of the disclosure may be included in or mounted on a mobile computing device or a non-mobile computing device such as a wearable device, a smartphone, a tablet PC, a PC, a PDA, a laptop computer, a smart speaker, a media player, a micro-server, a GPS device, an electronic book terminal, a digital broadcasting terminal, a navigation device, a kiosk, an MP3 player, a digital camera, an electronic control device of a vehicle, or a CID, or a home appliance that is controllable by an IoT platform.

FIGS. 1A through 1D will be described on the assumption that an electronic apparatus according to an embodiment of the disclosure is a smartphone, but the same principles could be applied to other types of devices. In FIGS. 1A through 1D, the same elements are denoted by the same reference numerals, and a repeated explanation will not be given.

FIG. 1A is a view for describing an electronic apparatus 100 that performs speaker recognition.

The electronic apparatus 100 may receive a speech signal uttered by a user 10 and may perform speaker recognition based on the received speech signal.

The term 'speaker recognition' used herein may refer to an operation of analyzing unique characteristics of a user who utters a speech signal based on the received speech signal, and automatically determining a person who spoke the received speech signal. The speaker recognition that is speaker identification using speech recognition may be used for identity verification.

In detail, referring to FIG. 1A, the electronic apparatus 100 may first receive a speech signal uttered by the user 10 and may perform a speech recognition operation of recognizing the received speech signal. The term 'speech recognition operation' used herein refers to an operation of detecting or recognizing a speech signal that is a received audio signal as speech of a user.

The electronic apparatus 100 may perform a speaker recognition operation based on the speech signal recognized by performing the speech recognition operation.

Also, speaker registration may be performed as a prerequisite for speaker recognition. For example, the electronic apparatus 100 may perform the speaker registration based on a speech signal uttered by the user 10. In detail, after the user 10 newly purchases the electronic apparatus 100, the user 10 may utter speech for user registration. The electronic apparatus 100 may complete the user registration by registering the uttered speech as a speech signal for speaker recognition.

At a later time, when the electronic apparatus 100 receives the speech signal for speaker recognition, the electronic apparatus 100 may perform the speaker recognition operation of determining whether a speaker who utters the received speech signal matches the registered user. In detail, the electronic apparatus 100 may perform a comparison and may determine whether a speech feature corresponding to the received speech signal for speaker recognition is similar or identical to a speech feature extracted during the speaker registration. The electronic apparatus 100 may determine whether the speaker who utters the speech signal is the registered user according to a result of the comparison.

When the speaker who utters the speech signal is the registered user as a result of the speaker recognition, the electronic apparatus 100 may recognize the speech signal uttered by the user 10 that is subsequently received and may perform an operation corresponding to the recognized speech signal.

Also, when the speaker who utters the speech signal is not the registered user as a result of the speaker recognition, the electronic apparatus 100 may end the speech recognition without performing an additional operation. In detail, the electronic apparatus 100 may output an audio or visual message indicating that the speaker is not the registered user and may not perform the operation corresponding to the speech signal uttered by the speaker.

Also, speaker recognition may be performed for various purposes other than speaker registration. For example, speaker recognition may be performed to determine whether a registered speaker is correct. Also, for the purpose of providing a personalized service corresponding to a recognized speaker, speaker recognition may be performed to specify who the speaker is.

Also, although the electronic apparatus 100 performs speaker recognition in FIG. 1A, operations for performing speaker recognition may be performed by at least one of the electronic apparatus 100, a server (not shown), or another electronic apparatus (not shown) such as a wearable device, and will be described in detail with reference to FIGS. 1B through 1D.

Figure 1B:
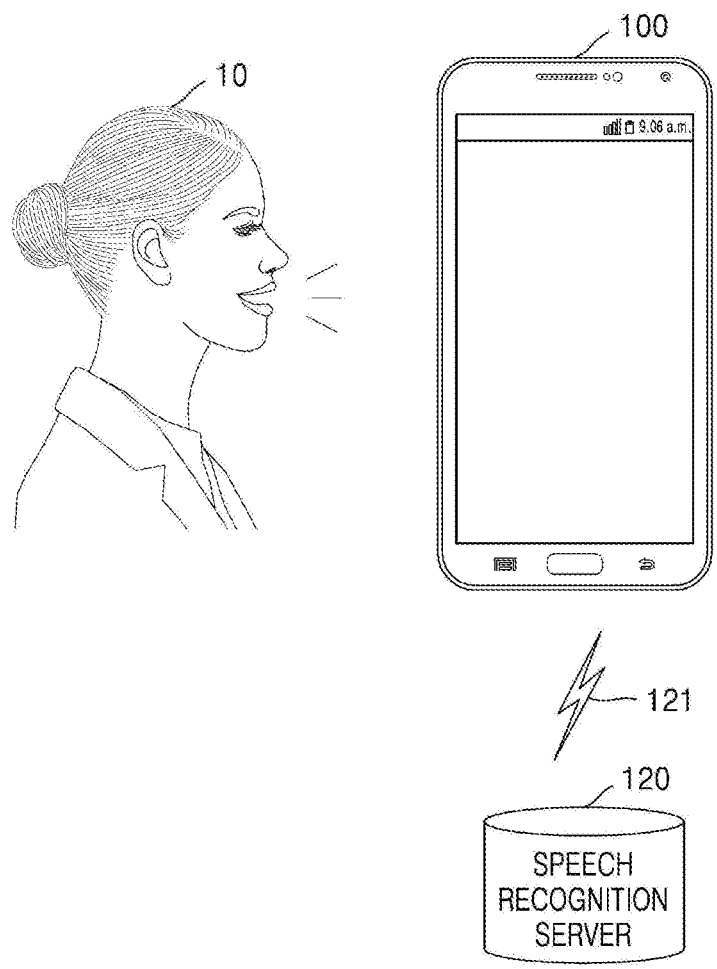
FIG. 1B is a view for describing an electronic apparatus according to another embodiment of the disclosure that performs speaker recognition.

Referring to FIG. 1B, a speaker recognition operation may be performed by the electronic apparatus 100 and a speech recognition server 120. The speech recognition server 120 may be connected by wire or wirelessly to the electronic apparatus 100. In FIG. 1B, the electronic apparatus 100 and the speech recognition server 120 are connected to each other through a wireless network 121. The wireless network 121 may be a network following a communication protocol such as Bluetooth, wireless local area network (WLAN) (e.g., Wi-Fi), wireless broadband (Wibro), world interoperability for microwave access (Wimax), code-division multiple access (CDMA), 4G LTE, millimeter waves, or wideband code division multiple access (WCDMA). The following will be described on the assumption that the electronic apparatus 100 and the speech recognition server 120 transmit/receive predetermined data through a network following a Wi-Fi communication protocol.

In detail, the electronic apparatus 100 may receive a speech signal uttered by the user 10 and may transmit the received speech signal to the speech recognition server 120. The speech recognition server 120 may recognize the received speech signal as speech of the user 10 and may transmit a result of the speech recognition to the electronic apparatus 100. The electronic apparatus 100 may perform an operation corresponding to the received result of the speech recognition.

Figure 1C:
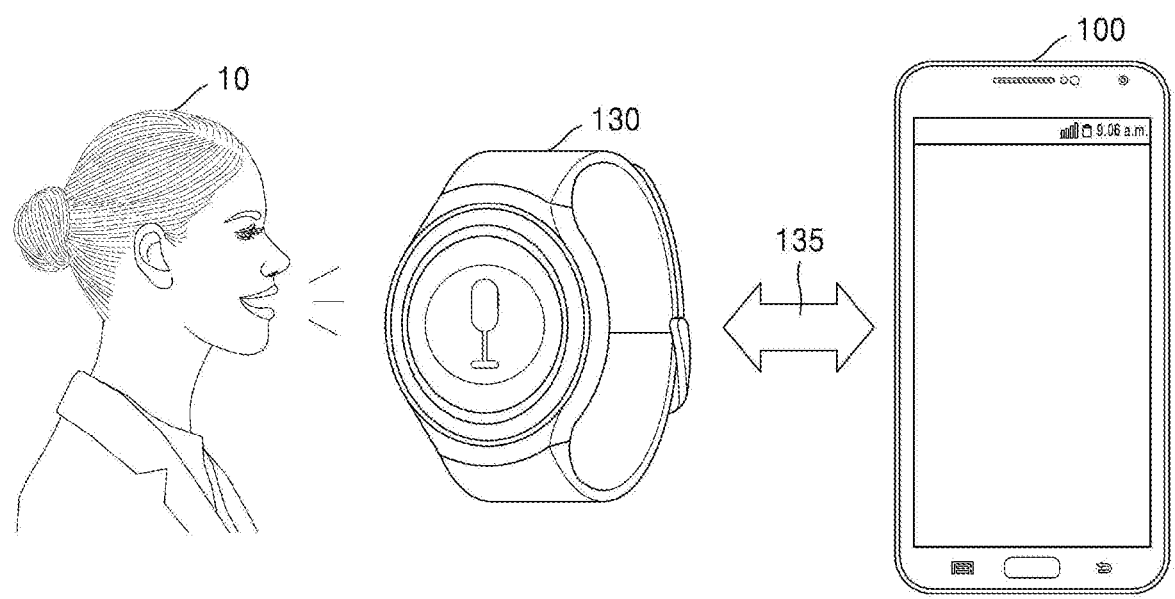
FIG. 1C is a view for describing an electronic apparatus according to another embodiment of the disclosure that performs speaker recognition.

Referring to FIG. 1C, the speaker recognition operation may be performed by the electronic apparatus 100 and a wearable device 130. The wearable device 130 may be another electronic apparatus that is physically separated from the electronic apparatus 100 and is connected through a wired or wireless network to the electronic apparatus 100. In FIG. 1C, the electronic apparatus 100 and the wearable device 130 are connected to each other through a wireless network 135.

In detail, the wearable device 130 receives a speech signal uttered by the user 10. The wearable device 130 transmits the received speech signal to the electronic apparatus 100 through a wireless network, for example, the wireless network 135 following a Bluetooth communication protocol. The electronic apparatus 100 may recognize the speech signal as speech.

Figure 1D:
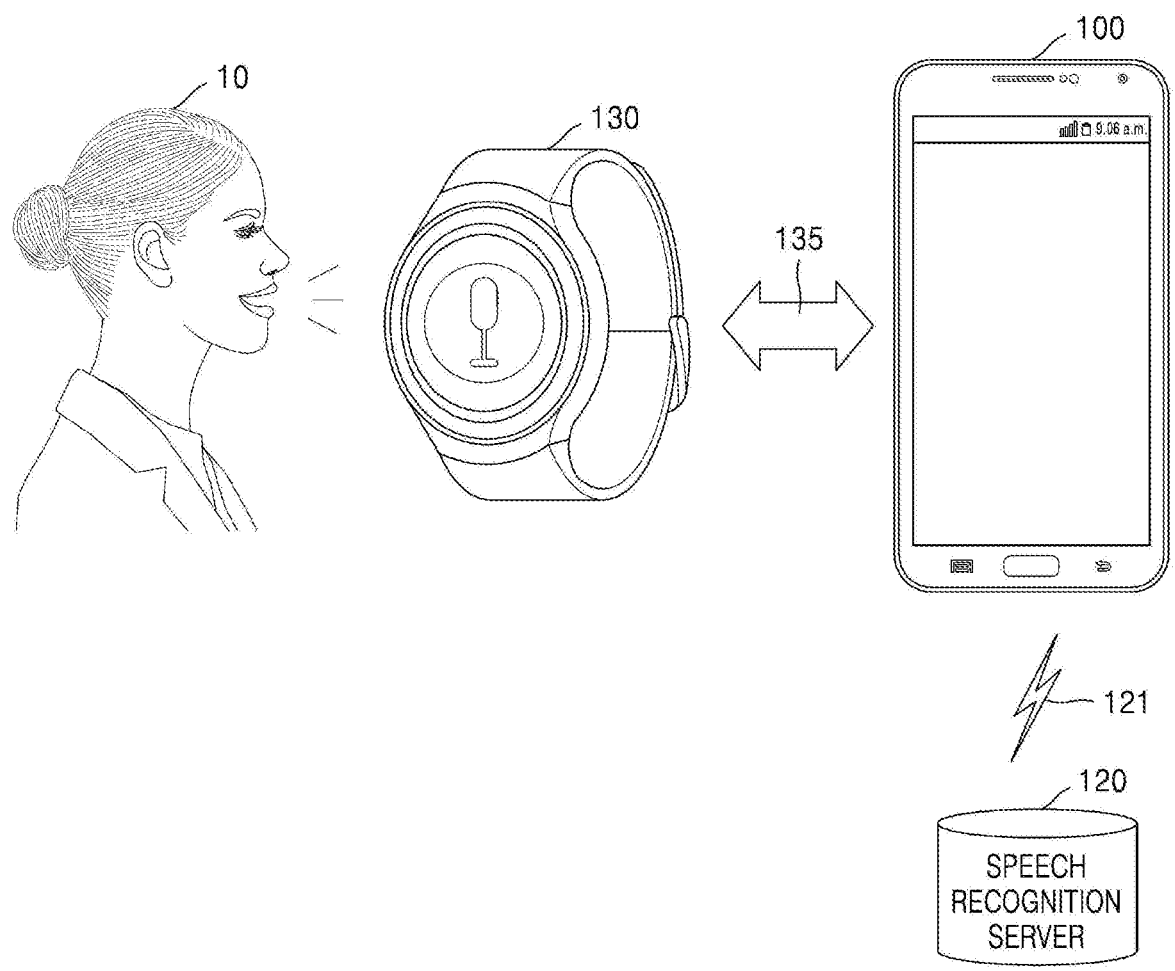
FIG. 1D is a view for describing an electronic apparatus according to the other embodiment of the disclosure that performs speaker recognition.

Referring to FIG. 1D, a speaker recognition operation may be performed by the electronic apparatus 100, the wearable device 130, and the speech recognition server 120.

In detail, the wearable device 130 that is an external electronic apparatus receives a speech signal from the user 10 and transmits the received speech signal to the electronic apparatus 100. The electronic apparatus 100 transmits the received speech signal to the speech recognition server 120. The speech recognition server 120 may perform speech recognition on the received speech signal.

As described above, a speech recognition operation for speaker recognition or speaker registration may be performed by using at least one of an electronic apparatus (e.g., the electronic apparatus 100), a wearable device (e.g., the wearable device 130) that is operable in association with the electronic apparatus, or a server (e.g., the speech recognition server 120) that may be connected to the electronic apparatus through a predetermined communication network. For convenience of explanation, the following will be described on the assumption that a speech recognition operation is performed by an electronic apparatus.

It is important when performing a speech recognition operation to accurately determine whether a speaker is a registered user. That is, in an electronic apparatus that performs speaker recognition, it is important to improve speaker recognition performance and increase a speaker recognition success rate or speaker recognition accuracy.

A method of processing a speech signal and an electronic apparatus thereof according to an embodiment of the disclosure which may improve speaker recognition performance by flexibly responding to any case where a single speaker exists, a plurality of speakers exist, or a speech signal uttered by a speaker in an environment where there is noise is received will be described in detail with reference to the attached drawings.

Figure 2:
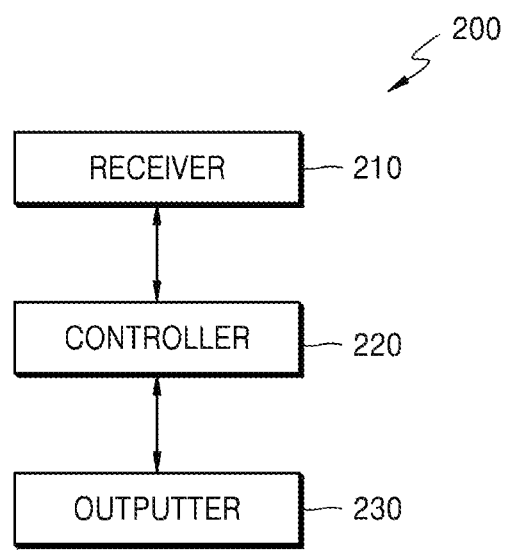
FIG. 2 is a block diagram of an electronic apparatus according to an embodiment of the disclosure.

FIG. 2 is a block diagram of an electronic apparatus 200 according to an embodiment of the disclosure.

Referring to FIG. 2, the electronic apparatus 200 according to an embodiment of the disclosure includes a receiver 210, a controller 220, and an outputter 230. The electronic apparatus 200 corresponds to the electronic apparatus 100 of FIG. 1A, and thus, when the electronic apparatus 200 is described, the same elements as those in FIG. 1A will not be repeatedly described.

The electronic apparatus 200 processes a speech signal to perform speaker registration or speaker recognition. The electronic apparatus 200 that is capable of performing speaker registration or speaker recognition may be implemented as any of various types. For example, the electronic apparatus 200 may include at least one of the electronic apparatus 100, a wearable device, or a server as described with reference to FIGS. 1A through 1D. For example, the electronic apparatus 200 may be formed as a single electronic apparatus such as a smartphone. The electronic apparatus could also be formed as a smart speaker.

In order to perform speaker registration, speech recognition has to be performed on speech uttered by a speaker who is to be registered. That is, in order to perform speaker registration, speech recognition of a speaker is performed.

Accordingly, hereinafter, both speaker registration or speaker recognition will be referred to as 'speaker recognition'.

The receiver 210 obtains a speech signal of a first user.

In detail, the receiver 210 may obtain an audio signal. The audio signal may include only the speech signal of the first user. Also, the audio signal may include both the speech signal of the first user and a noise signal generated in an environment where the first user utters. When the audio signal includes both the speech signal of the first user and the noise signal, the receiver 210 may extract only the speech signal of the first user from the audio signal by performing a speech recognition operation.

Also, the receiver 210 may directly obtain the speech signal from the first user through a speech receiving device such as a wireless microphone or a wired microphone. The receiver may also be implemented with a wired or wireless microphone, or a plurality of microphones that are wired or wireless. Also, the receiver 210 may receive the speech signal of the first user received from an external speech receiving device (not shown) through a communication module (not shown). The external speech receiving device may be a wireless microphone or a wired microphone that is independent of the electronic apparatus 200, an external electronic apparatus (not shown) (e.g., a wearable device) that may receive speech, or an external server (not shown) that receives and/or stores the speech signal of the first user.

The communication module (not shown) may be connected to the external speech receiving device (not shown), which is physically separated from the electronic apparatus 200, through a wired/wireless communication network and may receive a speech signal through the wired/wireless communication network.

Also, the communication module (not shown) may be provided in the receiver 210, or may be formed as a separate module from the receiver 210 and may be included in the electronic apparatus 200. In detail, the communication module (not shown) includes at least one communication module such as a short-range communication module, a wired communication module, a mobile communication module, and a broadcast receiving module. The at least one communication module refers to a communication module that may transmit/receive data through a network following a communication protocol such as Bluetooth, WLAN (e.g., Wi-Fi), Wibro, Wimax, CDMA, or WCDMA. Any of these modules could be implemented with circuitry configured to communicate as such. For example, the communication module could include Wi-Fi communication circuitry or CDMA communication circuitry.

For example, when the external speech receiving device (not shown) is a wearable device (not shown) connected to the electronic apparatus 200 through a Bluetooth communication network, the wearable device (not shown) may receive the speech signal uttered by the first user. The wearable device (not shown) may transmit the received speech signal to the electronic apparatus 200 through the Bluetooth communication network. The communication module (not shown) (e.g., the Bluetooth communication module/circuitry) of the electronic apparatus 200 may transmit the received speech signal to the controller 220.

The controller 220 may compare a speech feature extracted from the speech signal of the first user with a reference value, may obtain a first user feature that corresponds to the speech feature of the first user compared with the reference value, and may generate a recommended sentence used for speaker recognition based on the first user feature. In detail, the controller 220 may receive the speech signal uttered by the first user from the receiver 210. The controller 220 may extract the speech feature from the speech signal. Next, the controller 220 may compare the extracted speech feature with the reference value, may obtain the first user feature that corresponds to the speech feature of the first user compared with the reference value, and may generate the recommended sentence used for speaker recognition based on the first user feature.

In detail, the controller 220 may include at least one processor. The controller could also be a multi-core processor. Each of the at least one processor may execute at least one operation, which will be described in below, by executing at least one instruction. Namely, at least one operation performed by the controller 220 may be the same as at least one operation performed by a processor (not shown). Also, the controller 220 may control the predetermined operation to be executed by controlling at least one processor that is provided inside the controller 220 or at least one processor that is provided outside the controller 220. The predetermined operation may include an operation of extracting the speech feature from the speech signal of the first user, an operation of comparing the speech feature extracted from the speech signal of the first user with the reference value, an operation of obtaining the first user feature that corresponds to the speech feature of the first user compared with the reference value, and an operation of generating the recommended sentence used for speaker recognition based on the first user feature.

The reference value may be a comparison reference value used to extract a predetermined unit sound of the speech signal uttered by the first speaker in order to increase discrimination power of the first speaker who utters the received speech signal.

The reference value will be described below in detail with reference to FIGS. 4 and 5.

The controller 220 may obtain the speech feature of the first user compared with the reference value as the first user feature. In detail, at least one unit sound having a large difference between the speech feature extracted from the speech signal of the first user and the reference value may be obtained as the first user feature. In detail, at least one unit sound whose difference between the speech feature extracted from the speech signal of the first user and the reference value is equal to or greater than a predetermined range may be obtained as the first user feature. The first user feature will be described below in detail with reference to FIGS. 4 and 5.

The controller 220 may generate the recommended sentence to include the at least one unit sound included in the first user feature.

Also, the controller 220 may control an overall operation of the electronic apparatus 200.

The outputter 230 outputs the recommended sentence. In detail, the outputter 230 outputs the recommended sentence generated by the controller 220 so that a user, for example, the first user, recognizes the recommended sentence visually or audibly.

In detail, the outputter 230 may include at least one of an audio device (not shown) that outputs audio data or a display (not shown) that outputs image data. That is, the outputter may be a speaker, a plurality of speakers, or a display screen such as an LCD or an OLED, or a combination of at least one speaker and at least one display.

In detail, when the outputter 230 includes the audio device (not shown), the audio device may output the recommended sentence as an audio signal that may be audibly recognized by the user. Alternatively, when the outputter 230 includes the display (not shown), the display may output a user interface screen including the recommended sentence.

Figure 3:
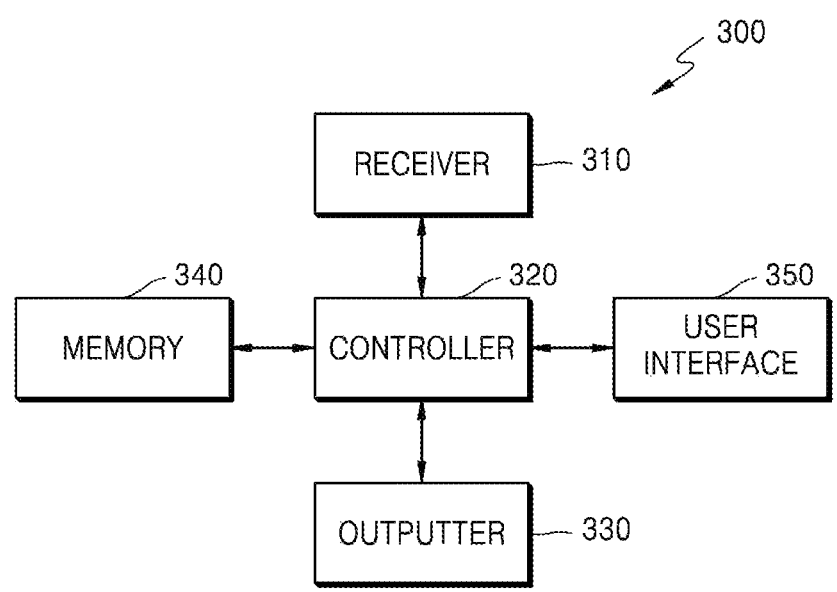
FIG. 3 is a block diagram of an electronic apparatus according to another embodiment of the disclosure.

FIG. 3 is a block diagram of an electronic apparatus 300 according to another embodiment of the disclosure.

The electronic apparatus 300 according to another embodiment of the disclosure may correspond to the electronic apparatus 200 of FIG. 2. Also, a receiver 310, a controller 320, and an outputter 330 included in the electronic apparatus 300 respectively correspond to the receiver 210, the controller 220, and the outputter 230 included in the electronic apparatus 200 of FIG. 2. Accordingly, when elements included in the electronic apparatus 300 are described, the same elements as those in FIG. 2 will not be repeatedly described.

Referring to FIG. 3, the electronic apparatus 300 may further include at least one of a memory 340 or a user interface 350, when compared to the electronic apparatus 200.

The controller 320 corresponded to the controller 220 may include at least one processor. Each of the at least one processor may execute at least one operation by executing at least one instruction. For example, the controller 320 includes a processor or a multi-core processor (not shown). In this case, at least one operation performed by the controller 220 may be the same as at least one operation performed by a processor (not shown).

The outputter 330 may include at least one of a speaker (not shown) or a display (not shown). The speaker (not shown) outputs an audio signal so that a user audibly recognizes predetermined information. The display (not shown) outputs a video signal such as a screen so that the user visually recognizes the predetermined information.

Also, when outputting the predetermined information to the user, the outputter 330 may output only the audio signal or only the video signal. Also, the outputter 330 may simultaneously output the audio signal and the video signal.

In an embodiment of the disclosure, when the controller 320 generates the audio signal by synthesizing a recommended sentence generated as text data, the speaker (not shown) may output the generated audio signal. Alternatively, when the controller 320 generates a screen including the recommended sentence generated as text data, the display 332 may output the screen.

The memory 340 may include at least one of predetermined data or programs including instructions for performing a predetermined operation.

In an embodiment of the disclosure, the memory 340 may store a speech signal of a user who is registered as a user of the electronic apparatus 300, a speech signal corresponding to the recommended sentence uttered by the user, and a speech signal corresponding to a registered sentence uttered by the user to correspond to the recommended sentence output by the outputter 230.

In an embodiment of the disclosure, the memory 340 may include at least one type of storage medium from among a flash memory type, a hard disk type, a multimedia card micro type, a card type memory (e.g., a SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

The user interface 350 may receive a user input for controlling the electronic apparatus 300. The user interface 350 may include a user input device including, but not limited to, a touch panel that detects a touch of the user, a button or button array that receives a push operation of the user, a wheel that receives a rotation operation of the user, a key board, and a dome switch.

In an embodiment of the disclosure, the user interface 350 may receive a touch input or a button input that accepts the recommended sentence output by the outputter 330.

A speech feature used in the disclosure will now be described in detail.

In an embodiment of the disclosure, the controller 320 may obtain a speech feature of a first user compared with a reference value as a first user feature.

In order to perform speech recognition or speaker recognition based on the speech recognition, the speech feature may include feature values for distinguishing a human sound from a non-human sound (e.g., noise, an animal sound, or an artificial sound). In detail, the speech feature may be extracted from a speech signal that is recognized as speech and may be represented by using a feature vector. In detail, the speech feature may be represented by using a feature vector for speaker recognition that is strong for speaker recognition.

For example, the electronic apparatus 300 may receive an audio signal in real time. The electronic apparatus 300 may divide the received audio signal into units of frames of a predetermined length, and may process the audio signal divided into units of frames. The electronic apparatus 300 may detect a speech signal in units of frames from the audio signal divided into units of frames. The audio signal may be a signal including a speech signal of a speaker and a noise signal, and the speech signal may be a signal corresponding to speech uttered by the speaker.

In detail, the electronic apparatus 300 may extract, from the speech signal, the feature vector for speaker recognition that is strong for speaker recognition. The electronic apparatus 300 may extract the feature vector for speaker recognition by converting a time domain-based speech signal into a frequency domain-based signal and modifying frequency energy of the frequency domain-based signal.

For example, the feature vector for speaker recognition may be, but is not limited to, a mel-frequency cepsttral coefficient (MFCC) or filter bank energy, and may be extracted from the speech signal in any of various ways.

The electronic apparatus 300 may determine whether the speaker of the speech signal is a registered speaker. The electronic apparatus 300 may generate speaker information indicating the speaker who utters the speech signal based on feature information extracted from the speech signal and may determine whether the speaker who utters the speech signal is the registered speaker based on the generated speaker information.

The term 'registered speaker' used herein may be a main user of the electronic apparatus 300. For example, when the electronic apparatus 300 is a smartphone as in FIGS. 1A through 1D, the owner of the smartphone may be the registered speaker. The electronic apparatus 300 may register a speaker based on a user input, or may store a predetermined speaker as the registered speaker as a default value. The electronic apparatus 300 may store one speaker as the registered speaker, or may store a plurality of speakers as the registered speakers.

In an embodiment of the disclosure, the electronic apparatus 300 may store a speech feature of a specific speaker as registered speaker information.

The speech feature may be extracted for each predetermined unit sound. The predetermined unit sound may a mono-phoneme, or a phoneme context comprehensively considering phonemes located before and after a corresponding phoneme. Also, the phoneme context may be tri-phonemes considering one phoneme located before a corresponding phoneme and one phoneme located after the corresponding phoneme. Hereinafter, a sound having a predetermined unit will be referred to as a 'unit sound'. That is, the unit sound may be a mono-phoneme, a phoneme context, or tri-phonemes.

Also, the speech feature may be represented by using an i-vector value. In detail, when a distribution of acoustic parameters extracted from the speech signal is modeled as a Gaussian mixture model (GMM), information obtained by subtracting a universal background model (UBM) from a GMM super-vector formed by connecting average values of the Gaussians may be represented as the product of an i-vector and a transformation matrix such as a total variability transformation matrix. Because the UBM is a value obtained by using large data indicating speech features of a plurality of various speakers and the total variability transformation matrix is a value determined according to a model for speaker recognition, for example, the GMM, the i-vector may be obtained by obtaining the speech signal of the speaker. Also, many methods are used to obtain the i-vector and are well known to one of ordinary skill in the field of speaker recognition, and thus a detailed explanation thereof will not be given.

As described above, once the speech signal is obtained, the i-vector may be obtained from the obtained speech signal, and the i-vector may be represented as a value that varies according to each unit sound.

In an embodiment of the disclosure, the controller 320 may compare each of a plurality of unit sounds extracted in a predetermined unit from the speech signal of the first user with a reference value having the predetermined unit. The predetermined unit may be a mono-phoneme or a phoneme context. Each unit sound feature that is a speech feature of a unit sound may be represented by using the i-vector or a value corresponding to the i-vector. Next, the controller 320 may extract, as the first user feature, at least one unit sound feature that is extracted from the speech signal of the first user and has a low similarity to the reference value based on a result of the comparison. Whether a similarity to the reference value is low may be determined according to whether a difference between the reference value and a speech feature corresponding to the reference value is equal to or greater than a predetermined range. Also, the predetermined range may be determined based on reliability in speech recognition, speech recognition performance, speech recognition accuracy, a speech sore, and a product specification of the electronic apparatus 300. Alternatively, whether a similarity to the reference value is low may be determined by extracting a predetermined number of unit sounds in an order in which a difference between the reference value and the speech feature corresponding to the reference value increases. The speech score that corresponds to a speech recognition rate may be generated in the electronic apparatus 300 or a speech recognition server (not shown) so that the speech score is proportional to the speech recognition rate.

A comparison operation of the controller 320 when a mono-phoneme is used as a unit sound will be described with reference to FIG. 4, and a comparison operation of the controller 320 when a phoneme context is used as a unit sound will be described with reference to FIG. 5.

Figure 4:
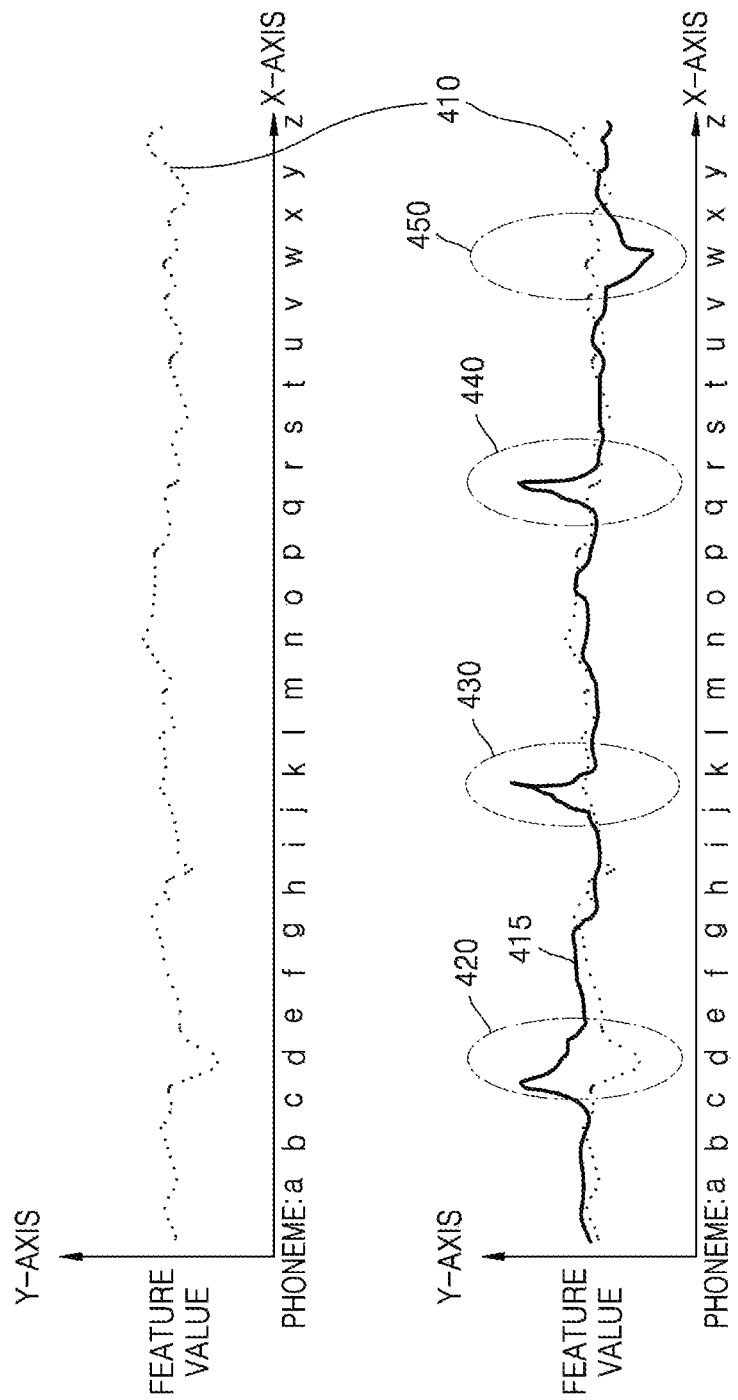
FIG. 4 is a view for describing a comparison operation performed by the electronic apparatus according to an embodiment of the disclosure.

FIG. 4 is a view for describing a comparison operation performed by the electronic apparatus 300 according to an embodiment of the disclosure.

In an embodiment of the disclosure, when a main user of the electronic apparatus 300 exists, for example, when the electronic apparatus 300 is a smartphone, a registered speaker may be a single speaker. In this case, the electronic apparatus 300 may perform speaker recognition by extracting a feature of the registered speaker. Accordingly, when a speech feature extracted from a speech signal of a speaker who speaks is compared with a speech feature corresponding to a plurality of speakers and the speech feature of the speaker who utters that is clearly distinguished from the speech feature of the plurality of speakers is used, speaker recognition may be performed more easily.

In FIG. 4, the x-axis represents a plurality of unit sounds that may be extracted from a speech signal, and the y-axis represents a feature value of a speech feature extracted from the speech signal. Although mono-phonemes are illustrated as unit sounds along the x-axis in FIG. 4, the unit sounds along the x-axis may be phoneme contexts.

Also, the feature value along the y-axis may be a value corresponding to an i-vector.

A graph 410 of FIG. 4 may be a graph corresponding to a reference value or plural reference values. For example, the graph 410 may be a graph illustrating a general and average speech feature of speech signals of general speakers. Also, the graph 410 may be a graph illustrating a speech feature of a speaker other than a first user who utters a speech signal from among a plurality of speakers using the electronic apparatus 300. A graph 415 is a graph illustrating a speech feature or speech features of a specific speaker, for example, the first user, using the electronic apparatus 300.

The reference value or reference values may vary according to whether speaker recognition is performed on a single speaker or a plurality of speakers.

First, a reference value corresponding to a case where the electronic apparatus 300 performs speaker recognition on a single speaker will be described.

For example, when the electronic apparatus 300 is a smartphone, the graph 415 may be a graph illustrating a speech feature extracted from a speech signal uttered by the first user who is the owner of the smartphone. In detail, when the electronic apparatus 300 is a product mainly used by a single speaker, the electronic apparatus 300 may use a value indicating an average speech feature of a plurality of users as the reference value.

In detail, the controller 320 may compare the speech feature of the first user who utters the speech signal with the average speech feature of the plurality of users for each unit sound by using the reference value indicating the average speech feature of the plurality of users and may extract at least one unit sound having a large difference as a result of the comparison as a first user feature.

In detail, when the unit sound is a phoneme context, the reference value may be a value representing the average speech feature of the plurality of users in a phoneme context unit. Also, when the unit sound is a mono-phoneme, the reference value may be a value representing the average speech feature of the plurality of users in a mono-phoneme unit.

Also, the reference value may be set in the electronic apparatus 300, and may be set and input by at least one of a manufacturer, a seller, or a user of the electronic apparatus 300.

In detail, the reference value may vary according to whether a user who is to be recognized by the electronic apparatus 300 is a single speaker or a plurality of speakers, and, when the user is a plurality of speakers, whether there is a speech feature similarity between the plurality of speakers. For example, when the electronic apparatus 300 is an electronic product that requires speaker recognition performed on a single speaker, the reference value may be a value indicating an average speech feature of a plurality of various speakers.

Referring to FIG. 4, when the graph 410 that illustrates a general and average speech feature of speech signals of general speakers and the graph 415 that is a speech feature of the first user are compared with each other, a unit sound having a difference that is equal to or greater than a predetermined range may be extracted as a first user feature. A difference exceeding the predetermined range may be a difference large enough to recognize a different speaker in consideration of accuracy, speech recognition performance, a speech score, etc. of the electronic apparatus 300.

For example, when the reference value is clearly distinguished from the speech feature of the first user at portions 420, 430, 440, and 450 of FIG. 4, for example, when a difference between the reference value and the speech feature of the first user exceeds the predetermined range, the controller 320 of the electronic apparatus 300 may extract unit sounds in the portions 420, 430, 430, and 450, for example, d, k, r, and w, as the first user feature.

The controller 320 may generate a recommended sentence so that letters including the unit sounds included in the first user feature, for example, mono-phonemes or phoneme contexts, are included in the recommended sentence.

Accordingly, when a speech feature extracted from a speech signal of a speaker who speaks is compared with a speech feature corresponding to a plurality of speakers and the speech feature of the speaker who speaks that is clearly distinguished from the speech feature of the plurality of speakers is used, speaker recognition may be performed more easily.

Next, a reference value and a comparison operation corresponding to a case where the electronic apparatus 300 performs speaker recognition on a plurality of speakers will be described.

In an embodiment of the disclosure, when there are a plurality of users of the electronic apparatus 300, for example, when the electronic apparatus 300 is a digital TV at home, a registered speaker may be a plurality of speakers living together in the home. For example, people to be recognized to control the digital TV may be family members living together in the home.

In this case, the electronic apparatus 300 needs to clearly discriminate between plural speakers who are to be recognized. In detail, users commonly using home appliances that are controllable by a home IoT platform may be family members. However, when the family members have a similar speech feature, a plurality of speakers having the similar speech feature have to be discriminatively recognized, thereby reducing a speaker recognition rate. For example, when the family members include two sisters of similar ages, speech features of the two sisters may be similar to each other. Alternatively, when the family members include a father and a grown-up son, speech features of the father and the grown-up son may be similar to each other. In this case, a reference value applied when speaker recognition of the first user is performed may be a value indicating a speech feature of another speaker having a similar speech feature and using the electronic apparatus 300. In this case, the graph 410 of FIG. 4 may illustrate a value indicating a speech feature of another speaker using the electronic apparatus 300.

That is, when the electronic apparatus 300 performs speaker recognition on a plurality of users including the first user, the reference value may be a value indicating a speech feature extracted from a speech signal of a second user included in the plurality of users. Preferably, the second user may have a speech similarity to the first user. A case where a speech feature of another user having a speech similarity is used will be described below in detail with reference to FIGS. 1, 12A, and 12B.

Figure 5:
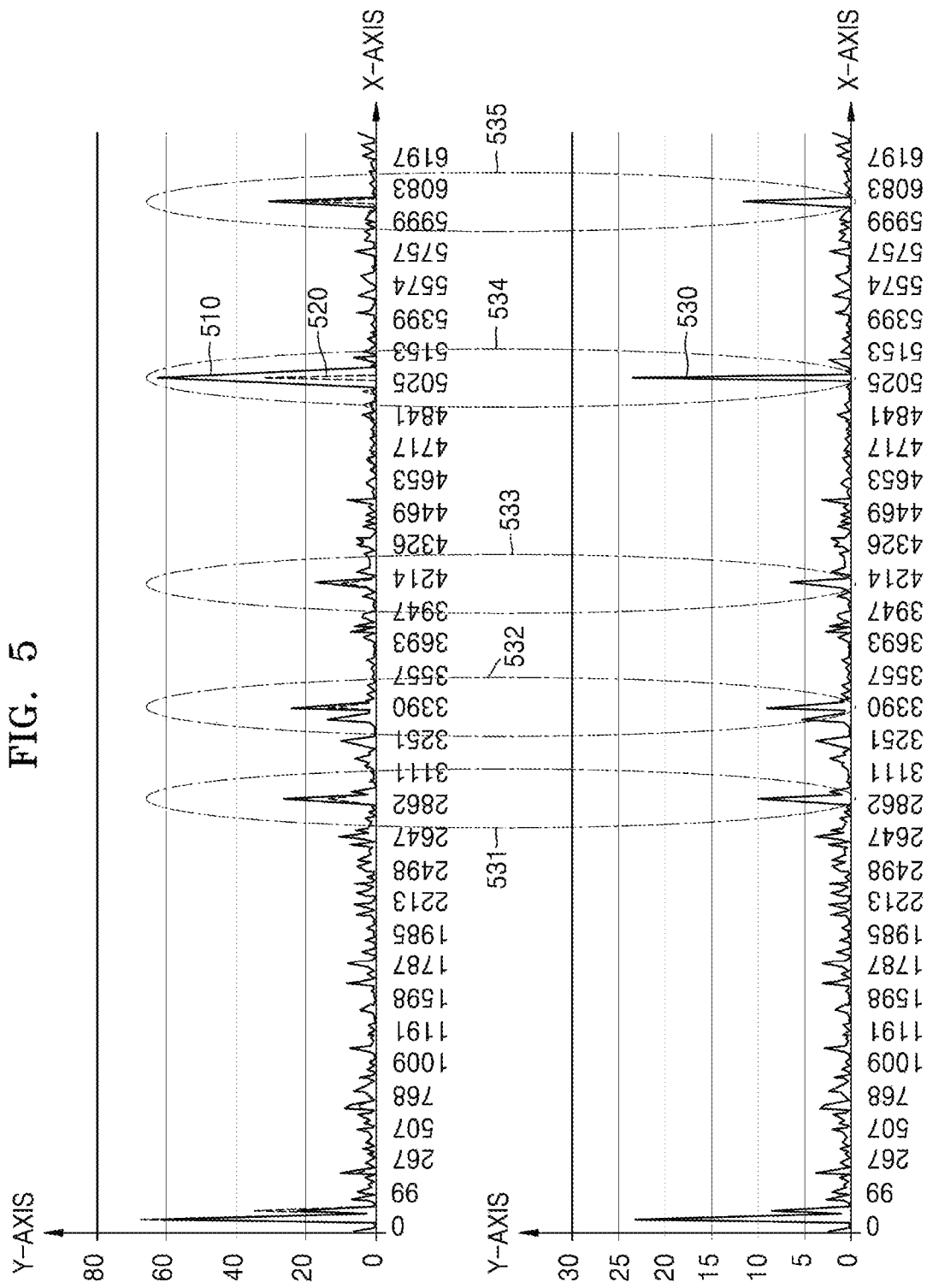
FIG. 5 is a view for describing a comparison operation performed by the electronic apparatus according to another embodiment of the disclosure.

FIG. 5 is a graph for describing a comparison operation performed by the electronic apparatus 300 according to an embodiment of the disclosure.

In FIG. 5, a graph 510 and a graph 520 may respectively correspond to the graph 410 and the graph 415. Accordingly, when elements of FIG. 5 are described, the same elements as those in FIG. 4 will not be repeatedly described.

Referring to FIG. 5, the x-axis represents a plurality of unit sounds that may be extracted from a speech signal, and the y-axis represents a feature value of a speech feature extracted from the speech signal. Whereas FIG. 4 illustrates mono-phonemes as unit sounds along the x-axis, FIG. 5 illustrates state IDs corresponding to phoneme contexts as unit sounds along the x-axis.

When the electronic apparatus 300 uses a phoneme context, instead of a mono-phoneme, as a unit sound, the electronic apparatus 300 may recognize a finer kind of sound. Accordingly, the electronic apparatus 300 may perform speech recognition and speaker recognition more accurately by using a speech feature corresponding to the phoneme context.

In detail, in FIG. 5, the x-axis may represent unit sounds each having a state ID unit corresponding to a phoneme context, and the y-axis in the graph 510 and the graph 520 may be an i-vector value. The phoneme context may be tri-phonemes.

In FIG. 5, a graph 530 illustrates, as a root mean square (RMS), a difference between the graph 510 that illustrates a speech feature extracted from a speech signal uttered by a first user and the graph 520 that illustrates a reference value. In this case, phoneme contexts corresponding to portions 531, 532, 533, 534, and 535 where an RMS exceeds a predetermined threshold value may be obtained as a first user feature. That is, phoneme contexts having state IDs of 2862, 3390, 4214, 5025, and 6083 may be obtained as a first user feature.

Next, the controller 320 may generate a recommended sentence so that letters including the phoneme contexts included in the first user feature are included in the recommended sentence.

Figure 6:
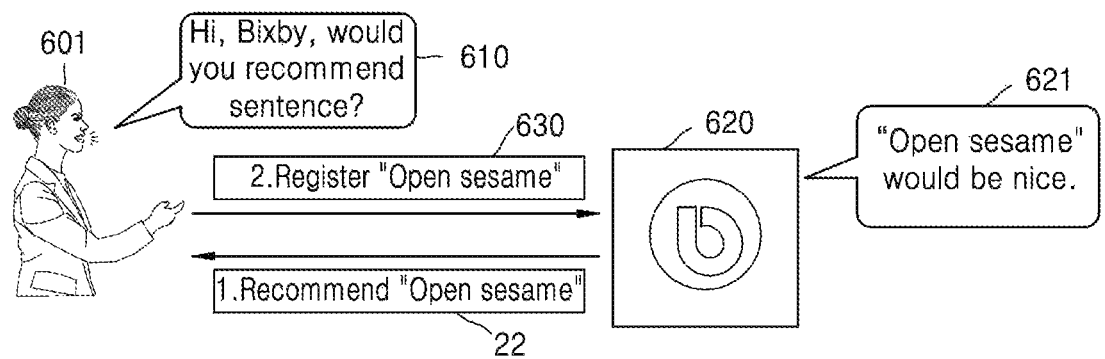
FIG. 6 is a view for describing a recommended sentence output operation performed by an electronic apparatus according to an embodiment of the disclosure.

FIG. 6 is a view for describing a recommended sentence output operation performed by an electronic apparatus 620 according to an embodiment of the disclosure. In FIG. 6, a first user 601 may correspond to the first user of FIGS. 1A through 3, and an electronic apparatus 620 may correspond to the electronic apparatus 300 of FIG. 3.

The controller 320 may generate a recommended sentence so that letters corresponding to at least one unit sound included in a first user feature are included in the recommended sentence. The recommended sentence may be words, a phrase, or a sentence. An embodiment of FIG. 6 will be described on the assumption that a unit sound is a phoneme context such as 'ㅓ' or 'ㄹ'.

For example, when the controller 320 extracts unit sounds corresponding to "o," "p," "s," "a," and "m" as a first user feature, the controller 320 may generate 'open sesame' that is a recommended sentence including "o," "p," "s," "a," and "m" and may control the generated recommended sentence to be output.

Referring to FIG. 6, the first user 601 may request the electronic apparatus 620 to generate and output the recommended sentence. Herein, the electronic apparatus 620 of FIG. 6 corresponds to the electronic apparatus 300 of FIG. 3. For example, when the first user 601 utters 'Hi, Bixby, would you recommend sentence?' 610, the electronic apparatus 620 may perform speech recognition on 'Hi, Bixby, would you recommend sentence' 610 that is uttered by the first user 601 and may perform an operation for generating the recommended sentence that is requested. Accordingly, the electronic apparatus 620 may generate "open sesame' 22 that is the recommended sentence, may output the generated' 'open sesame' 22 as an audio signal through a speaker (not shown) that is provided inside the electronic apparatus 620.

Also, the electronic apparatus 620 may output a text message 621 indicating the recommended sentence through a display (not shown) provided inside the electronic apparatus 620.

The first user 601 may register a speech signal for speaker recognition by uttering the recommended sentence.

In detail, when the first user 601 utters the recommended sentence, the electronic apparatus 300 may receive the recommended sentence uttered by the first user 601 as a registered speech signal and may perform speaker recognition by using the registered speech signal. For example, the first user 601 may utter 'open sesame' 630, and the electronic apparatus 620 receives the first user uttered speech signal such as 'open sesame' 630. In detail, the electronic apparatus 620 may extract a speech feature from the registered speech signal and may obtain a registered speech feature. The electronic apparatus 620 may store the registered speech feature in the memory 340. After the registered speech signal is received and user registration is completed, when speaker recognition is performed at a later time, the electronic apparatus 620 may perform speaker recognition by determining whether the speaker matches a registered user.

In the above, a case where a recommended sentence generating operation is used for speaker registration to register the first user as a specific speaker has been described.

The recommended sentence generating operation may also be used to register a passphrase. In detail, in order to set a passphrase used for user authentication or access permission like a password, a pattern, and/or a keyword set to the electronic apparatus 620, the electronic apparatus 620 may perform the recommended sentence generating operation. For example, when the electronic apparatus 620 is a smartphone, the first user 601 may utter the passphrase, instead of inputting the password or the pattern, in order to unlock a lock screen. The electronic apparatus 620 may receive the passphrase uttered by the first user 601, and may unlock the lock screen when the received passphrase matches a registered passphrase.

As described above, when the recommended sentence is used to register the passphrase, the electronic apparatus 620 may generate the recommended sentence for speaker registration, and then may generate the recommended sentence for passphrase registration. In detail, in order to register the first user 601 as a main user, the electronic apparatus 620 may perform speaker registration. Accordingly, the electronic apparatus 620 may generate the recommended sentence for speaker registration and may provide the recommended sentence to the first user 601. When the speaker recognition of the first user 601 is completed, the electronic apparatus 620 may generate the recommended sentence for passphrase registration and then may provide the recommended sentence to the first user 601.

As described with reference to FIGS. 1A through 6, the electronic apparatus 200 or 300 according to an embodiment of the disclosure may extract a first user feature that is a speech feature of a first user that may increase discrimination power of a user who is to be recognized by using a reference value corresponding to a range of a speaker using the electronic apparatus 200 or 300 and may generate and output a recommended sentence based on the extracted first user feature.

According to an embodiment of the disclosure, the recommended sentence for more precisely and accurately discriminating the speaker to be recognized may be generated and provided to the user. The user may register speech for speaker recognition by using the output recommended sentence, thereby improving speaker recognition performance of the electronic apparatus 200, 300 or 620 and improving speaker recognition accuracy.

Figure 7:
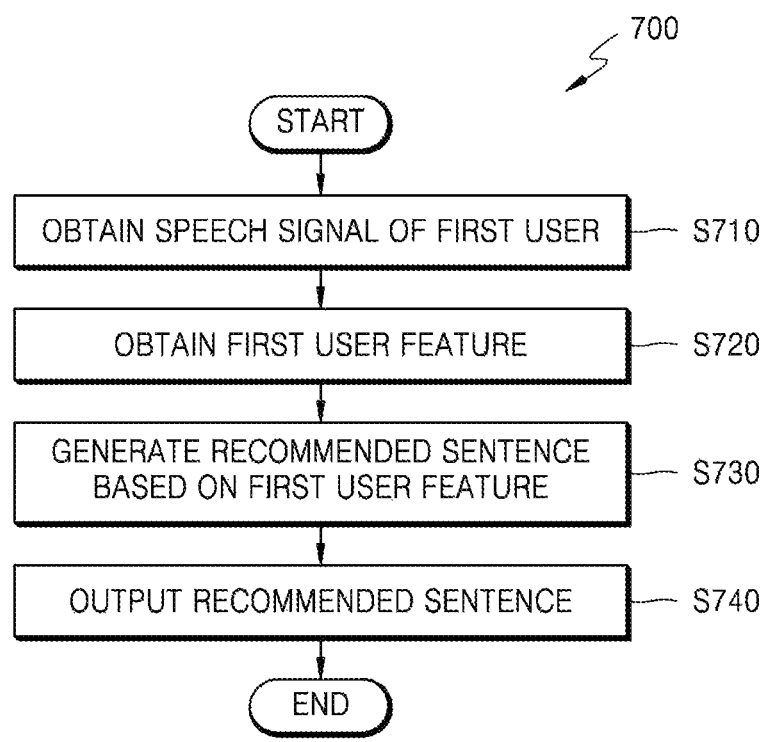
FIG. 7 is a flowchart of a method of processing a speech signal according to an embodiment of the disclosure.

FIG. 7 is a flowchart of a method 700 of processing a speech signal according to an embodiment of the disclosure. The method 700 according to an embodiment of the disclosure illustrated in FIG. 7 may include operations performed by the electronic apparatus 100, 200, or 300 described with reference to FIGS. 1A through 6. Accordingly, the method 700 may have the same technical spirit as that of the electronic apparatus 100, 200, or 300 of FIGS. 1A through 6. Accordingly, when the method 700 is described, a repeated explanation of previously-described aspects will not be given.

The following will be described on the assumption that the method 700 includes operations performed by the electronic apparatus 300 of FIG. 3.

Referring to FIG. 7, the method 700 is a method for performing speaker recognition in the electronic apparatus 300. The term 'speaker recognition' used herein may be construed to include both (i) speech recognition for speaker registration and (ii) speaker recognition performed to determine whether a speaker who utters a speech signal is a registered user.

In operation S710, a speech signal of a first user is obtained. Operation S710 may be performed by the receiver 310 under the control of the controller 320. Alternatively, operation S710 may be performed through an external electronic apparatus (not shown), e.g., a wearable device or an external microphone, which may operate in association with the electronic apparatus 300.

In operation S720, a speech feature extracted from the speech signal is compared with a reference value to obtain a first user feature that corresponds to the speech feature of the first user compared with the reference value. Operation S720 may be performed by the controller 320.

In detail, the speech feature may be extracted from the speech signal of the first user obtained in operation S710. The speech feature may be extracted for every unit sound. The unit sound may be a mono-phoneme, a phoneme context, or tri-phonemes. In detail, a plurality of speech features corresponding to a plurality of unit sounds included in the speech signal uttered by the first user may be extracted. The plurality of speech features respectively corresponding to the plurality of unit sounds may be compared with a plurality of reference values respectively corresponding to the plurality of unit sounds, and a speech feature having a large difference from the reference value based on a result of the comparison may be extracted as the first user feature. An operation of extracting the speech feature having a large difference from the reference value as the first user feature has already been described with reference to FIGS. 4 and 5, and thus a detailed explanation thereof will not be given.

In operation S730, a recommended sentence used for speaker recognition is generated based on the first user feature obtained in operation S720. Operation S730 may be performed by the controller 320. In detail, the recommended sentence may be generated to include at least one unit sound included in the first user feature obtained in operation S720. As shown in FIG. 6, the first user feature may include "o," "p," "s," "a," and "m". Accordingly, in operation S730, 'open sesame' that includes "o," "p," "s," "a," and "m" may be generated as the recommended sentence.

Figure 8:
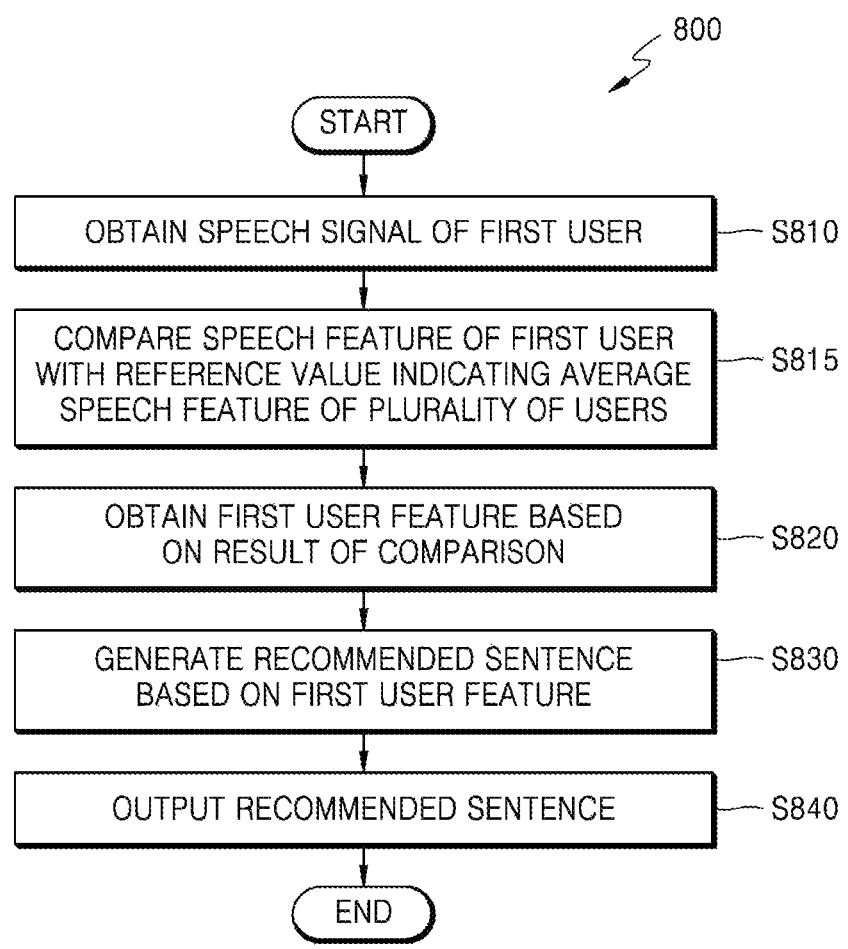
FIG. 8 is a flowchart of a method of processing a speech signal according to another embodiment of the disclosure.

In operation S740, the recommended sentence generated in operation S730 is output. Operation S740 may be performed by the outputter 330. In detail, operation S740 may be performed by the outputter 330 under the control of controller 320. FIG. 8 is a flowchart of a method of processing a speech signal according to another embodiment of the disclosure.

Figure 9:
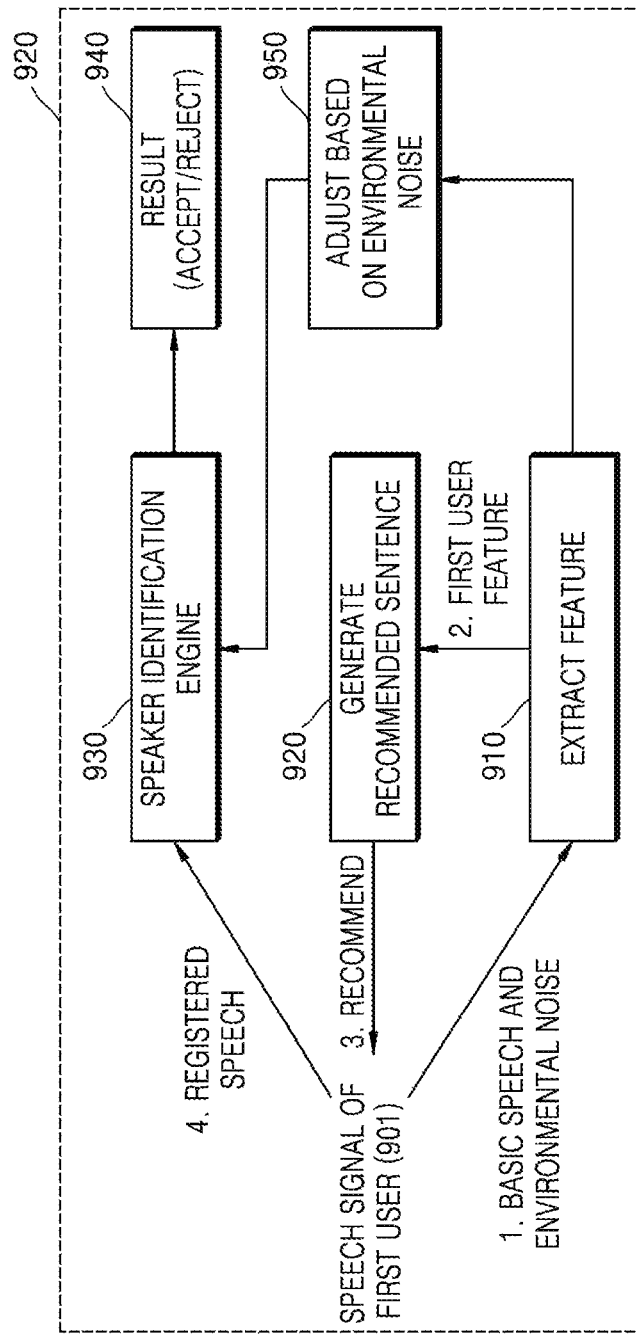
FIG. 9 is a diagram for describing an operation for single speaker recognition performed by a method of processing a speech signal and an electronic apparatus performing the same operation, according to an embodiment of the disclosure.

FIG. 9 is a diagram for describing an operation for single speaker recognition performed by a method of processing a speech signal and an electronic apparatus thereof according to an embodiment of the disclosure.

For example, when the electronic apparatus 300 is a product (e.g., a smartphone, a wearable device, a smart speaker, a PC, or a tablet PC) mainly used by one specific user, for example, the owner of the electronic apparatus 300, a speaker recognition operation needs to be performed by using speech of the owner (i.e., the specific user) of the electronic apparatus 300. In this case, a reference value used to obtain a first user feature may be a value corresponding to an average speech feature of a plurality of users.

A method and apparatus for speaker recognition of a specific user rather than a plurality of users will be described with reference to FIGS. 8 and 9.

Referring to FIG. 8, operations S810, S830, and S840 included in a method 800 of processing a speech signal according to an embodiment of the disclosure respectively correspond to operations S710, S730, and S740 included in the method 700 of FIG. 7. Accordingly, when the method 800 is described, a repeated explanation will not be given. Operations S815 and S820 may correspond to operation S720, which will be described in detail.

FIG. 9 illustrates functional blocks that perform operations for speaker recognition. In detail, operations in a block 920 are operations performed for speaker recognition by at least one of the electronic apparatus 300 or a speech recognition server (not shown). Operations corresponding to the functional blocks of FIG. 9 may be performed by one physical chip, module, or processor. Alternatively, operations corresponding to the function blocks of FIG. 9 may be performed by a plurality of chips, modules, or processors. The following will be described on the assumption that the block 920 of FIG. 9 is included in the controller 320 of the electronic apparatus 300.

Referring to FIGS. 8 and 9, in operation S810, a speech signal 901 of a first user is obtained. Basic speech and environmental noise may be included in the speech signal 901 of the first user. Accordingly, the controller 320 obtains a pure speech signal of the first user by removing the environmental noise included in the speech signal 901 by filtering noise of the speech signal 901. The 'environmental noise' may include all noise signals that may be generated in an environment where a speaker utters, and may be referred to as a 'noise signal'. In detail, the noise signal may be, for example, a wind sound, utterances of other speakers, and a mechanical sound generated in the environment where the speaker utters.

In operation S815, a speech feature extracted from the speech signal of the first user is compared with a reference value. In detail, in block operation 910, the controller 320 extracts the speech feature from the speech signal of the first user. The reference value is a value corresponding to an average speech feature of a plurality of users. Also, the reference value may be a value corresponding to each unit sound, and a plurality of the reference values respectively corresponding to a plurality of unit sounds may exist. In detail, when each unit sound is a phoneme context, the reference value may be a value representing the average speech feature of the plurality of users in a phoneme context unit. Also, when each unit sound is a mono-phoneme, the reference value may be a value representing the average speech feature of the plurality of users in a mono-phoneme unit.

Next, in operation S820, a first user feature that corresponds to the speech feature of the first user compared with the reference value is obtained. As described with reference to FIGS. 4 and 5, the speech feature of the first user compared with the reference value may be determined based on a difference between the reference value and the speech feature of the first user.

In operation S830, the controller 320 generates a recommended sentence based on the first user feature. In detail, in block operation 920, the recommended sentence may be generated to include at least one unit sound included in the first user feature obtained in operation S820.

In operation S840, the controller 320 may control the generated recommended sentence to be output as visual or audible information via a display or speaker. Alternatively, the controller could control the generated recommended sentence to be output as both visual and audible information via a display and a speaker. Accordingly, the electronic apparatus 300 may provide the recommended sentence to the first user.

Next, when the first user utters the recommended sentence, a registered speech signal that is a speech signal corresponding to the recommended sentence uttered by the first user may be received and speaker recognition may be performed by using the registered speech signal (operation not shown). In detail, the receiver 310 may receive the registered speech signal and may transmit the received registered speech signal to the controller 320. The controller 320 may extract a speech feature from the registered speech signal and may store the extracted speech feature as a registered feature of the first user. When the first user utters the registered speech signal for user authentication or speech control at a later time, a speaker identification engine 930 (see FIG. 9) may perform speech recognition on the registered speech signal.

In detail, the speaker identification engine 930 may identify whether the speaker who utters the speech signal is the first user based on a similarity between the registered feature of the first user and the speech feature extracted from the received speech. The similarity may vary according to speaker recognition accuracy, reliability in speaker recognition, a speech score, and a product specification. For example, when the similarity is equal to or greater than 95% in consideration of speech recognition performance, the electronic apparatus 300 may determine that the speaker who utters the speech signal is the first user.

The controller 320 may output a speaker identification result 940 of the speaker identification engine 930. For example, when a speaker recognition operation is performed for user authentication, the controller 320 may control a speaker or display to communicate a message saying 'the speaker matches a registered user' to be output as speech or an image so that a user knows a speaker authentication result. Alternatively, when the speaker identification operation is performed to execute a predetermined application, the controller 320 may determine whether to execute the predetermined application according to the speaker identification result 940. In detail, when the speaker who utters the speech is the registered user, the controller 320 may grant permission to execute the predetermined application, and when the speaker who utters the speech is not the registered user, the controller 320 may deny permission to execute the predetermined application.

Also, the method 700 or 800 according to an embodiment of the disclosure may further include an operation (not shown) of identifying whether the speaker who utters the speech is the registered user based on environmental noise.

In detail, in block operation 950, the controller 320 may adjust the speaker identification engine 930 based on the environmental noise. Also, the speaker identification engine 930 may include a speaker recognition model that performs speaker recognition based on the speech feature of the received speech signal. The speaker recognition model may determine whether the recognized speaker is correct based on a result obtained after comparing the speech feature of the received speech signal with a reference value (or a threshold value). Also, according to whether the recognized speaker is correct, the controller 320 may determine whether to execute the predetermined application according to the speaker identification result 940.

The environmental noise received by the receiver 310 of the controller 320 is referred to as a 'noise signal'. In detail, the controller 320 may extract a signal feature of the noise signal. The controller 320 may adjust at least one of a reference value (or a threshold value) applied to perform speaker recognition or a weight value applied to a predetermined unit sound included in the speech signal of the first user, based on the signal feature of the noise signal.

In detail, the adjusting of the speaker identification engine 930 may be performed by at least one of an operation (i) of adjusting the reference value (or the threshold value) used by the speaker identification engine 930 or an operation (ii) of adjusting the weight value applied to the predetermined unit sound included in the speech signal of the first user compared with the reference value.

The reference value is the basis for determining whether the received speech signal is that of the registered user. That is, the reference value that is the basis for determining whether the received speech signal has a speech feature of a registered speaker may also be referred to as a threshold value. When a feature value of the received speech signal is equal to or greater than the reference value, the controller 320 may determine that the speaker corresponding to the received speech signal is the same as the registered speaker. In detail, a comparison operation between the feature value of the speech signal and the reference value may be performed for each unit sound.

The controller 320 may analyze the environmental noise and may adjust the reference value (or the threshold value) for determining whether the speaker who utters the speech is the registered user based on a noise feature of the analyzed environmental noise. In detail, the controller 320 may obtain a speech feature of the noise signal and may increase or reduce the reference value in the speaker recognition model included in the speaker identification engine 930 based on the noise feature. For example, the controller 320 may increase or reduce the reference value so that the received speech signal is not masked by the noise signal.

Also, the controller 320 may analyze the environmental noise and may adjust the weight value to be applied to the speech feature to be extracted from the speech signal of the speaker who utters based on the noise feature of the analyzed environmental noise. The controller 320 may apply the adjusted weight value to the speech feature extracted from the speech signal of the speaker who utters, may compare the speech feature to which the weight value is applied with the reference value, and may determine whether the speaker who utters the speech is the registered user.

For example, speaker recognition may be performed in a vehicle. In the vehicle, there may be noise such as a vehicle engine sound or a navigation guidance sound. In this environment, the electronic apparatus 30 may perform speaker recognition to manipulate a predetermined menu in the vehicle. The noise generated in the vehicle may be regular noise (e.g., a vehicle engine sound) having a high signal-to-noise ratio (SNR) and a low frequency. Accordingly, the controller 320 may reduce the reference value and may apply the weight value to a speech feature corresponding to an affricate sound and a frictional sound in the received speech signal. In detail, the weight value exceeding 1 may be applied to the speech feature corresponding to the affricate sound and the frictional sound in the received speech signal and the speech feature to which the weight value is applied may be compared with the reference value. The affricate sound and the frictional may be a unit sound that is not masked by the noise generated in the vehicle, that is, is distinguished from the noise generated in the vehicle.

As another example, speaker recognition may be performed in a quiet living room environment. Because noise is not generated in the quiet living room environment, the controller 320 may increase the reference value. The controller 320 may compare the increased reference value with the speech feature of the received speech signal.

As another example, speaker recognition may be performed in an environment with irregular noise having a high frequency such as a metallic sound or a dish rattling sound of a kitchen. In this environment, the controller 320 may reduce the reference values corresponding to overall unit sounds. The controller 320 may apply the weight value to a speech feature of a voiced sound and a vowel sound that are unit sounds distinguished from the noise generated in the kitchen. In detail, the controller 320 may apply the weight value exceeding 1 to the speech feature corresponding to the voiced sound and the vowel sound and may compare the speech feature to which the weight value is applied with the reference value.

As another example, speaker recognition may be performed in an environment where a lot of people talk such as a café. Speech of people other than the speaker to be recognized may be considered as noise. In this environment, there is a large amount of background noise from persons other than the speaker. Accordingly, the controller 320 may reduce the reference values corresponding to overall unit sounds. Also, the controller 320 may not adjust the weight value. Accordingly, the controller 320 may compare the reduced reference value with the speech feature of the received speech signal for every unit sound.

As described above, the speaker identification engine 930 may be adjusted based on a feature of noise generated in an environment where speaker recognition is performed and a speaker recognition operation may be performed by using the adjusted speaker identification engine 930.

Accordingly, the electronic apparatus 300 according to an embodiment of the disclosure may accurately perform a speaker identification operation in any noise environment.

When a plurality of users sharing a predetermined electronic apparatus exist, a speaker recognition operation performed by an electronic apparatus will be described in detail with reference to FIGS. 10 and 11.

Figure 10:
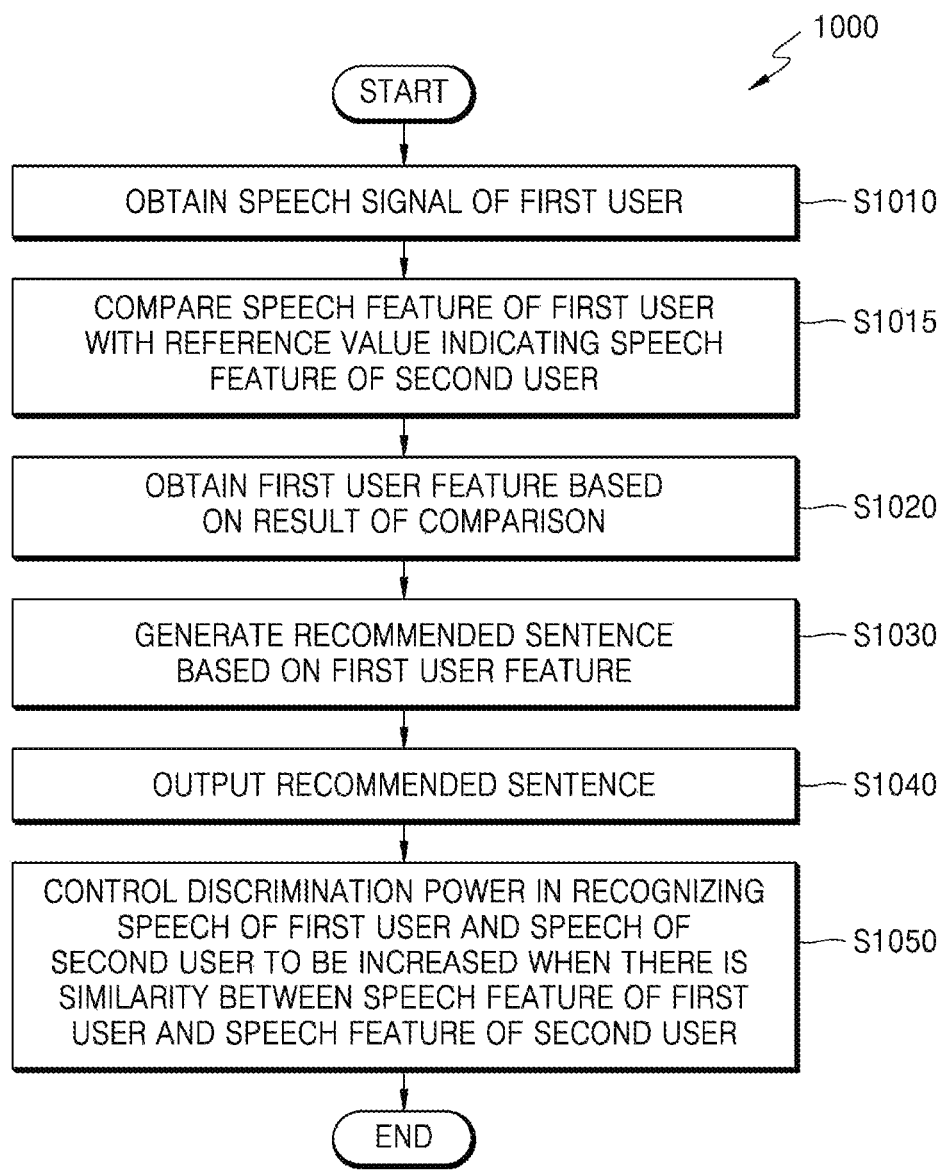
FIG. 10 is a flowchart of a method of processing a speech signal according to another embodiment of the disclosure.

FIG. 10 is a flowchart of a method of processing a speech signal according to another embodiment of the disclosure.

Figure 11:
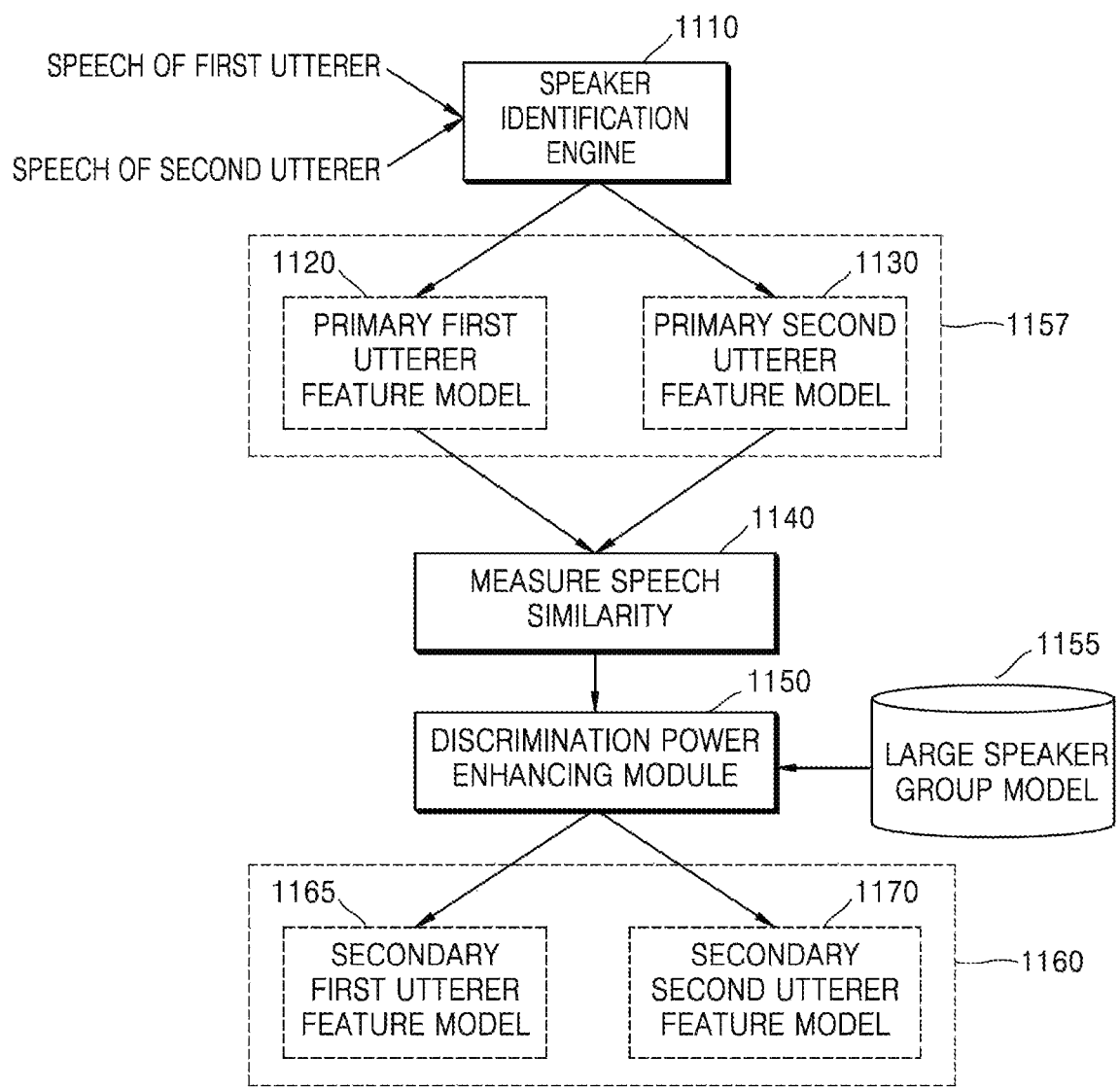
FIG. 11 is a diagram for describing an operation for multiple speaker recognition performed by a method of processing a speech signal and an electronic apparatus performing the same operation, according to an embodiment of the disclosure.

FIG. 11 is a diagram for describing an operation for multiple speaker recognition performed by a method of processing a speech signal and an electronic apparatus thereof according to an embodiment of the disclosure.

For example, a plurality of users (e.g., family members or roommates) living together in a home may commonly use a predetermined electronic apparatus such as a TV, a refrigerator, or a washing machine. In this case, the speakers who are registered to the predetermined electronic apparatus may be all of the family members. Accordingly, the predetermined electronic apparatus has to register and recognize each of the family members and has to perform speaker registration and recognition by distinguishing a first user, who is one user from among the plurality of family members, from the other users. In this case, a reference value used to obtain a first user feature may be a value corresponding to a speech feature of at least one user from among the family members or a value corresponding to an average speech feature of the family members.

Referring to FIG. 10, operations S1010, S1030, and S1040 included in a method 1000 of processing a speech signal according to an embodiment of the disclosure respectively correspond to operations S710, S730, and S740 included in the method 700 of FIG. 7. Accordingly, when the method 1000 is described, a repeated explanation will not be given. Operations S1015 and S1020 may correspond to operation S720, which will be described in detail. Also, although an operation (or a step) of adjusting a speaker identification engine according to environmental noise described with reference to FIG. 9 is not included in the method 1000 of FIG. 10, the operation of adjusting the speaker identification engine according to the environmental noise described with reference to FIG. 9 may be additionally performed after operation S1040 of the method 1000.

FIG. 11 illustrates functional blocks that perform operations for speaker recognition. In detail, block operations 1110, 1155, 1140, 1150, and 1160 illustrated in FIG. 11 are operations performed for speaker recognition by at least one of the electronic apparatus 300 or a speech recognition server (not shown). In detail, the block operations 1110, 1155, 1140, 1150, and 1160 may be performed by the controller 320 of the electronic apparatus 300.

Operations corresponding to the functional blocks of FIG. 11 may be performed by one physical chip, module, or processor. Alternatively, operations corresponding to the functional blocks of FIG. 11 may be performed by a plurality of chips, modules, or processors.

The following will be described on the assumption that the block operations of FIG. 11 are performed by the controller 320 of the electronic apparatus 300.

When an electronic apparatus (e.g., a TV) is commonly used by family members living together in a home, speaker registration and speaker recognition may be performed to control or use the electronic apparatus. For example, when the family members include a father, a mother, an older daughter, and a younger daughter, the TV that is the electronic apparatus has to register and recognize all of the father, the mother, the older daughter, and the younger daughter. A speech similarity between the two sisters, that is, the older daughter and the younger daughter, may be high. In general, when a speech similarity is high, it may be difficult to accurately discriminatively recognize a speaker. In an embodiment of FIGS. 10 and 11, operation S1050 may be performed to register and recognize a speaker by accurately distinguishing a plurality of speakers having a high speech similarity.

Referring to FIGS. 10 and 11, in operation S1010, a speech signal of a first user is obtained. The 'first user' may correspond to a 'first utterer' illustrated in FIG. 11.

In operation S1015, a speech feature extracted from the speech signal of the first user is compared with a reference value.

When the electronic apparatus 300 is commonly used by a plurality of users including the first user, the reference value may be a value indicating a speech feature extracted from a speech signal of a second user included in the plurality of users. In detail, when the electronic apparatus 300 performs speaker registration and speaker recognition on the plurality of users including the first user, the reference value may correspond to a value indicating the speech feature extracted from the speech signal of the second user included in the plurality of users. Also, the plurality of users who are to be recognized by the electronic apparatus 300 may be the family members in the above example. The first user and the second user who are included in the family members may have a speech similarity.

Also, the reference value may be a value corresponding to an average speech feature of users other than the first user from among the plurality of users who commonly use the electronic apparatus 300. Also, the reference value may be a value corresponding to an average speech feature of at least two or more users having a speech similarity from among the plurality of users who commonly use the electronic apparatus 300. For example, from among the family members, the mother and the two daughters (the older daughter and the younger daughter) may be similar in at least one of accent, way of talking, or voice. In this case, there may be a speech similarity between the mother and the two daughters (the older daughter and the younger daughter). In the above example, when the older daughter is the first user, the reference value may be a value corresponding to an average speech feature of the mother and the younger daughter.

Also, the second user may be a user who is already registered as a speaker to the electronic apparatus 300. In detail, the electronic apparatus 300 may register the second user who is one of the plurality of users using the electronic apparatus 300, and then may perform speaker registration on the first user. A speech feature value needed for speaker registration of the first user may be extracted by using a speech feature value of the second user who is already registered as a speaker.

Next, in operation S1020, a first user feature that is a speech feature of the first user is obtained. As described with reference to FIGS. 4 and 5, the speech feature of the first user compared with the reference value may be determined based on a difference between the reference value and the speech feature of the first user. In detail, the controller 320 may compare a speech feature of a phoneme context unit extracted from the speech signal of the first user with a speech feature of a phoneme context unit extracted from the speech signal of the second user, and may extract at least one phoneme context whose difference between the speech feature of the first user and the speech feature of the second user exceeds a predetermined range as a result of the comparison as the first user feature.

In operation S1030, the controller 320 generates a recommended sentence based on the first user feature obtained in operation S1020. In detail, the controller 320 may generate the recommended sentence to include at least one unit sound included in the first user feature obtained in operation S1020.

In operation S1040, the controller 320 may control the generated recommended sentence to be output as visual or audible information. Accordingly, the electronic apparatus 300 may provide the recommended sentence to the first user.

Next, when the first user utters the recommended sentence, a registered speech signal that is a speech signal corresponding to the recommended sentence uttered by the first user may be received and speaker recognition may be performed by using the registered speech signal.

Also, operation S1050 may be further performed to increase a speaker recognition rate.

In detail, in operation S1050, when there is a similarity between the speech feature of the first user and the speech feature of the second user, discrimination power in recognizing speech of the first user and speech of the second user may be controlled to be increased.

In detail, when there is a similarity between the speech feature of the first user and the speech feature of the second user, in order to increase discrimination power in recognizing the speech of the first user and the speech of the second user, at least one of the speech feature of the first user, the speech feature of the second user, a 'first utterer feature model' that is a model used to recognize the speech signal of the first user or a 'second utterer feature model' that is a model used to recognize the speech signal of the second user may be modified. Next, speaker recognition may be performed by using the modified at least one of the speech feature of the first user, the speech feature of the second user, the 'first utterer feature model' that is a model used to recognize the speech signal of the first user, or the 'second utterer feature model' that is a model used to recognize the speech signal of the second user.

In detail, referring to FIG. 11, a speaker identification engine 1110 may correspond to the speaker identification engine 930 of FIG. 9.

The speaker identification engine 1110 may receive speech of each of a plurality of users. The plurality of users may include a 'first utterer' and a 'second utterer', and the first utterer and the second utterer may respectively correspond to the first user and the second user. The speaker identification engine 1110 may extract the speech feature of the first user who is the first utterer and may extract the speech feature of the second user who is the second utterer. The speaker identification engine 1110 may generate a feature model of the first utterer based on the speech feature of the first utterer. The speaker identification engine 1110 may generate a feature model of the second utterer based on the speech feature of the second utterer. In detail, the speaker identification engine 1110 may primarily generate a primary first utterer feature model 1120 and a primary second utterer feature model 1130. The primary first utterer feature model 1120 and the primary second utterer feature model 1130 may be models generated based on the speech feature of the first utterer and the speech feature of the second utterer that are not modified.

Next, in block operation 1140, a speech similarity between the first utterer and the second utterer is measured based on the speech feature of the first utterer and the speech feature of the second utterer.

Figure 12A:
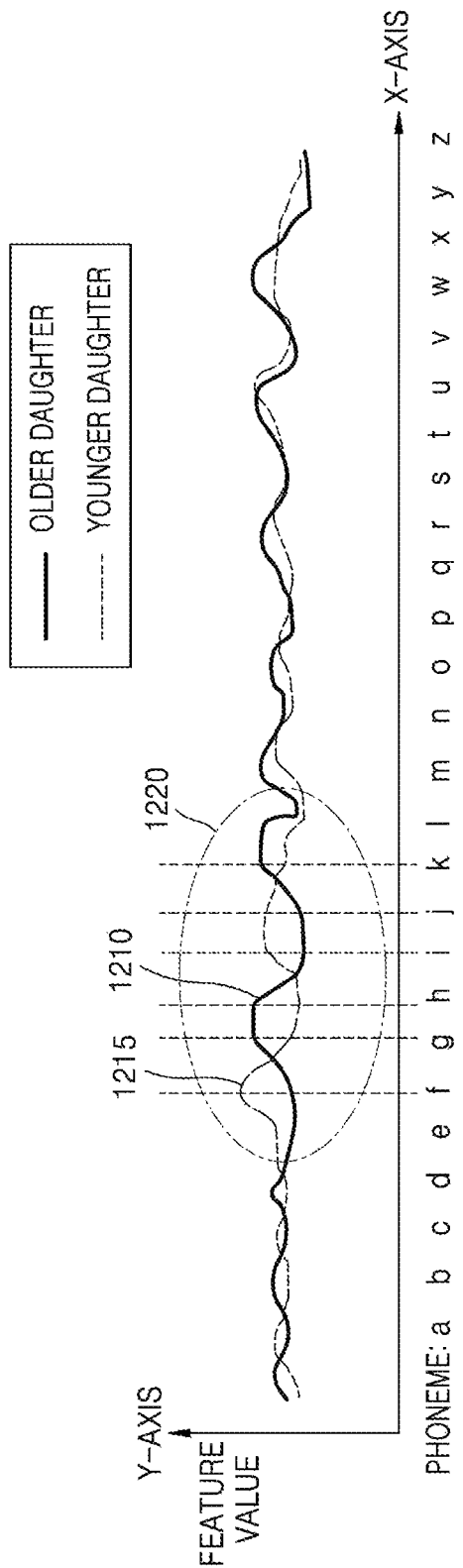
FIG. 12A is a graph for describing an operation for multiple speaker recognition performed by a method of processing a speech signal and an electronic apparatus performing the same operation, according to another embodiment of the disclosure.

FIG. 12A is a graph for describing an operation for multiple speaker recognition performed by a method of processing a speech signal and an electronic apparatus thereof according to another embodiment of the disclosure. In FIG. 12A, a unit sound is a mono-phoneme such as a, b, c, or d, but the operation could also be performed with multiple phenomes.

Referring to FIG. 12A, a graph 1210 illustrates a speech feature of a first utterer and a graph 1215 illustrates a speech feature of a second utterer. For example, from among family members commonly using the electronic apparatus 300, the first utterer may be an older daughter and the second utterer may be a younger daughter.

A speech similarity may be determined based on a difference between a plurality of speech features corresponding to a plurality of utterers that are to be compared with one another. In detail, when a difference between speech features of the first utterer and the second utterer that are a plurality of utterers to be compared with each other is equal to or less than a predetermined threshold value, it may be determined that there is a speech similarity between the first utterer and the second utterer.

Referring to a portion 1220 of FIG. 12A, there are unit sounds h, g, h, l, j, and k whose differences between the speech feature of the first utterer in the graph 1210 and the speech feature of the second utterer in the graph 1215 are equal to or greater than a predetermined range. Whether there is a speech similarity may be determined based on the number of unit sounds whose differences between the speech feature of the first utterer in the graph 1210 and the speech feature of the second utterer in the graph 1215 are equal to or greater than the predetermined range, a specific value of each difference, or a total sum of the differences. Also, whether there is a speech similarity may be determined based on error probability of speech recognition, speech recognition accuracy, etc. when speaker recognition is performed based on the speech feature of the first utterer in the graph 1210 and the speech feature of the second utterer in the graph 1215.

Alternatively, when a large speaker group model for classifying utterers is generated based speech features, a speech similarity may be determined according to whether utterers are included in the same group in the large speaker group model. Also, a speech similarity may be determined based on a distance between utterers in the large speaker group model. The large speaker group model will be described in detail with reference to FIG. 12B.

The following will be described on the assumption that a speech similarity between speakers is determined based on a large speaker group model. In detail, the following will be described on the assumption that a speech similarity between speakers is determined based on a distance between speakers in a large speaker group model.

Figure 12B:
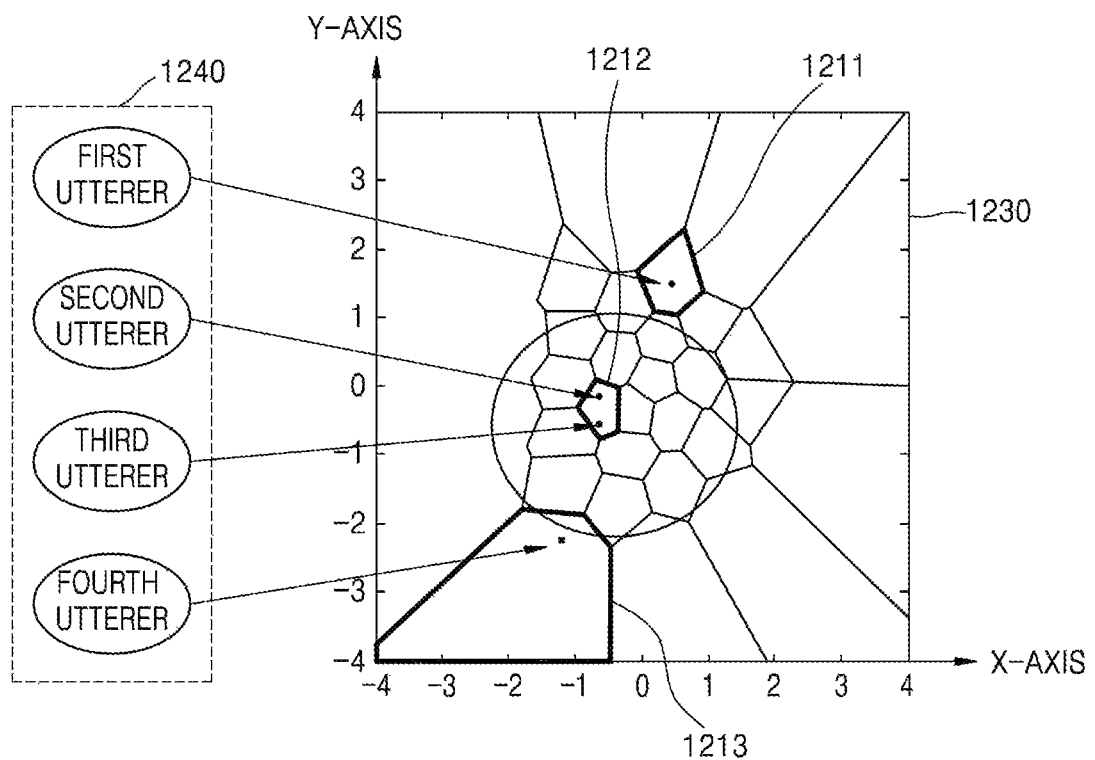
FIG. 12B is a view for describing a speech feature between a plurality of speakers having a similarity.

FIG. 12B is a view for describing a speech feature between a plurality of speakers having a similarity. The 'first utterer' and the 'second utterer' of FIG. 11 correspond to a 'second speaker' and a 'third speaker' of FIG. 12B.

Referring to FIG. 12B, a large speaker group model 1230 may be multi-dimensionally represented. The dimension of the large speaker group model 1230 may be the dimension of feature values indicating a speech feature of a speaker. For example, when an i-vector is used as the feature values indicating the speech feature of the speaker, the dimension of the large speaker group model 1230 may be the same as the dimension of the i-vector. For example, when the i-vector is three-dimensionally represented, the large speaker group model 1230 may be three-dimensionally represented.

In FIG. 12B, the large speaker group model 1230 is represented in a two-dimensional space with the X and Y-axes.

Referring to FIG. 12B, the large speaker group model 1230 including a plurality of users (e.g., family members 1240 commonly using the electronic apparatus 300 is illustrated. For example, the family members 1240 may include a father (a first speaker), a mother (a second speaker), an older daughter (a third speaker), and a younger daughter (a fourth speaker).

The large speaker group model 1230 groups speakers including similar speech features based on speech features of speakers. In detail, cells 1211, 1212, and 1213 included in the large speaker group model 1230 may classify the speakers having the similar speech features. In detail, the older daughter (the second speaker) and the younger daughter (the third speaker) may be included in the same cell 1212 of the large speaker group model 1230, and thus it may be determined that the older daughter (the second speaker) and the younger daughter (the third speaker) have a speech similarity. Also, the first speaker and the fourth speaker are included in different cells, and thus it may be determined that the first speaker and the fourth speaker have no speech similarity.

Once it is determined that there is a speech similarity, the controller 320 may modify a feature model of a speaker to increase speech discrimination power between a plurality of speakers having a speech similarity through a discrimination power enhancing module 1150. Accordingly, the controller 320 may modify the primary first utterer feature model 1120 to a secondary first utterer feature model 1165 and the primary second utterer feature model 1130 to a secondary second utterer feature model 1170. In detail, the discrimination power enhancing module 1150 may modify the primary first utterer feature model 1120 to the secondary first utterer feature model 1165 and the primary second utterer feature model 1130 to the secondary second utterer feature model 1170 by using a large speaker group model 1157. The large speaker group model 1157 may be generated and/or stored in the electronic apparatus 300.

Alternatively, the large speaker group model 1157 may be stored in a server or an external apparatus connected through a wired/wireless communication network to the electronic apparatus 300. In this case, the electronic apparatus 300 may access the large speaker group model 1157 through the wired/wireless communication network.

Modification of a feature model based on the large speaker group model 1157 will be described in detail with reference to FIG. 13.

Figure 13:
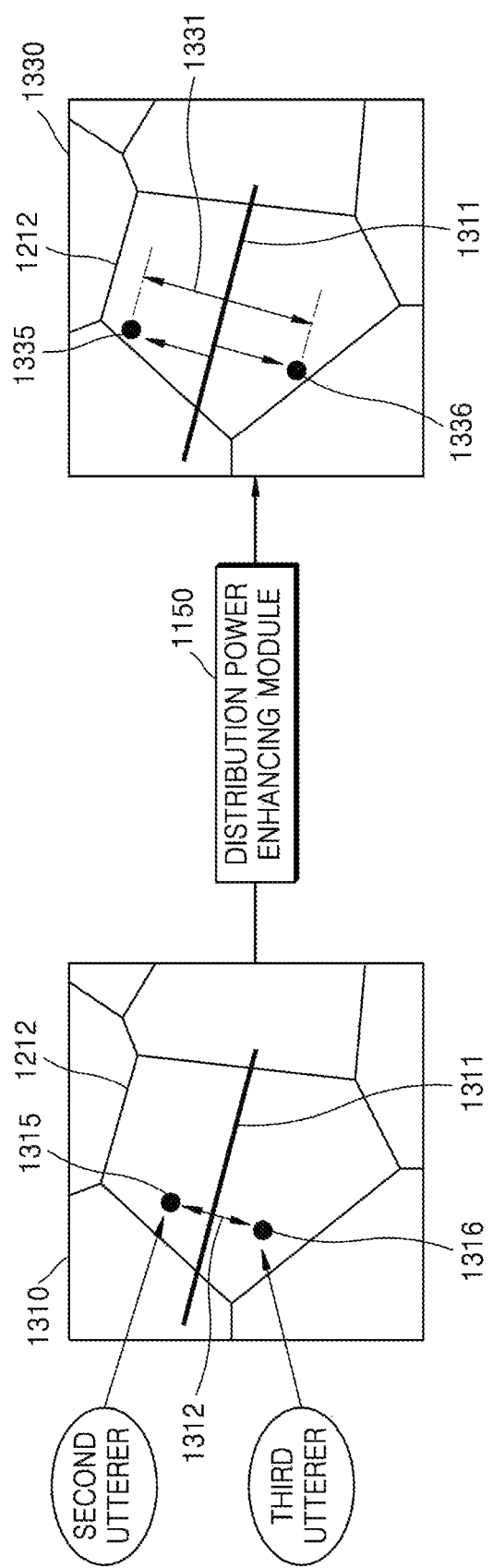
FIG. 13 is a view for describing an operation for increasing speech discrimination power between a plurality of speakers having a similarity, according to an embodiment of the disclosure.

FIG. 13 is a view for describing an operation of increasing speech discrimination power between a plurality of speakers having a similarity according to an embodiment of the disclosure. In FIGS. 13 and 12B, the same elements are denoted by the same reference numerals.

Referring to FIG. 13, a block 1310 is an enlarged view of the cell 1212 in which the second speaker and the third speaker are included, and the second speaker may correspond to a point 1315 in the cell 1212 and the third speaker may correspond to a point 1316 in the cell 1212.

In a large speaker group model, it may be determined that as a distance between speakers increases, a speech similarity between the speakers decreases. Also, it may be determined that as a distance between speakers deceases, a speech similarity between the speakers increases. Hereinafter, it may be determined that when a distance between speakers in the large speaker group model is equal to or less than a predetermined threshold value, there is a speech similarity between the speakers. In detail, referring to the cell 1212, because a distance between the point 1315 and the point 1316 respectively corresponding to the second speaker and the third speaker is equal to or less than the predetermined threshold value, it may be determined that there is a speech similarity between the second speaker and the third speaker.

Because there is a speech similarity between the second speaker and the third speaker, the controller 320 may modify at least one of feature models or speech features of the second speaker and the third speaker so that a distance between the point 1315 and the point 1316 respectively corresponding to the second speaker and the third speaker is equal to or greater than the predetermined threshold value and thus it is determined that there is no speech similarity between the second speaker and the third speaker.

In detail, the discrimination power enhancing module 1150 may modify at least one of feature models or speech feature values of the second speaker and the third speaker so that a distance between the point 1315 and the point 1316 respectively corresponding to the second speaker 2 and the third speaker is equal to or greater than the predetermined threshold value to become a distance 1331 between a point 1335 and a point 1336 respectively corresponding to the second speaker and the third speaker. There may be many methods of modifying feature models and speech feature values. For example, a speech feature value may be adjusted by setting a weight value to the speech feature value and multiplying the weight value by an original speech feature value. Alternatively, when a feature model corresponding to speech of a speaker is extracted, the feature model may be adjusted by excluding a speech feature corresponding to at least one unit sound having a highest speech similarity. Alternatively, two speakers may be included in different cells in the large speaker group model by changing a position of a reference axis (e.g., the X-axis and/or the Y-axis) of an i-vector indicating a speech feature.

Due to a discrimination power increasing operation of the discrimination power enhancing module 1150, the distance 1331 between the point 1335 and the point 1336 respectively corresponding to the second speaker and the third speaker is greater than the distance between the point 1315 and the point 1316 before adjustment. Accordingly, it may be determined that there is no speech similarity between the second speaker and the third speaker.

The secondary first utterer feature model 1165 may correspond to the point 1335 corresponding to the adjusted speech feature of the second speaker (the older daughter), and the secondary second utterer feature model 1170 may correspond to the point 1336 corresponding to the adjusted speech feature of the third speaker (the younger daughter). When speaker recognition is performed on the older daughter or the younger daughter at a later time, speaker recognition accuracy may be improved by performing speaker recognition by using the adjusted feature models.

Figure 14:
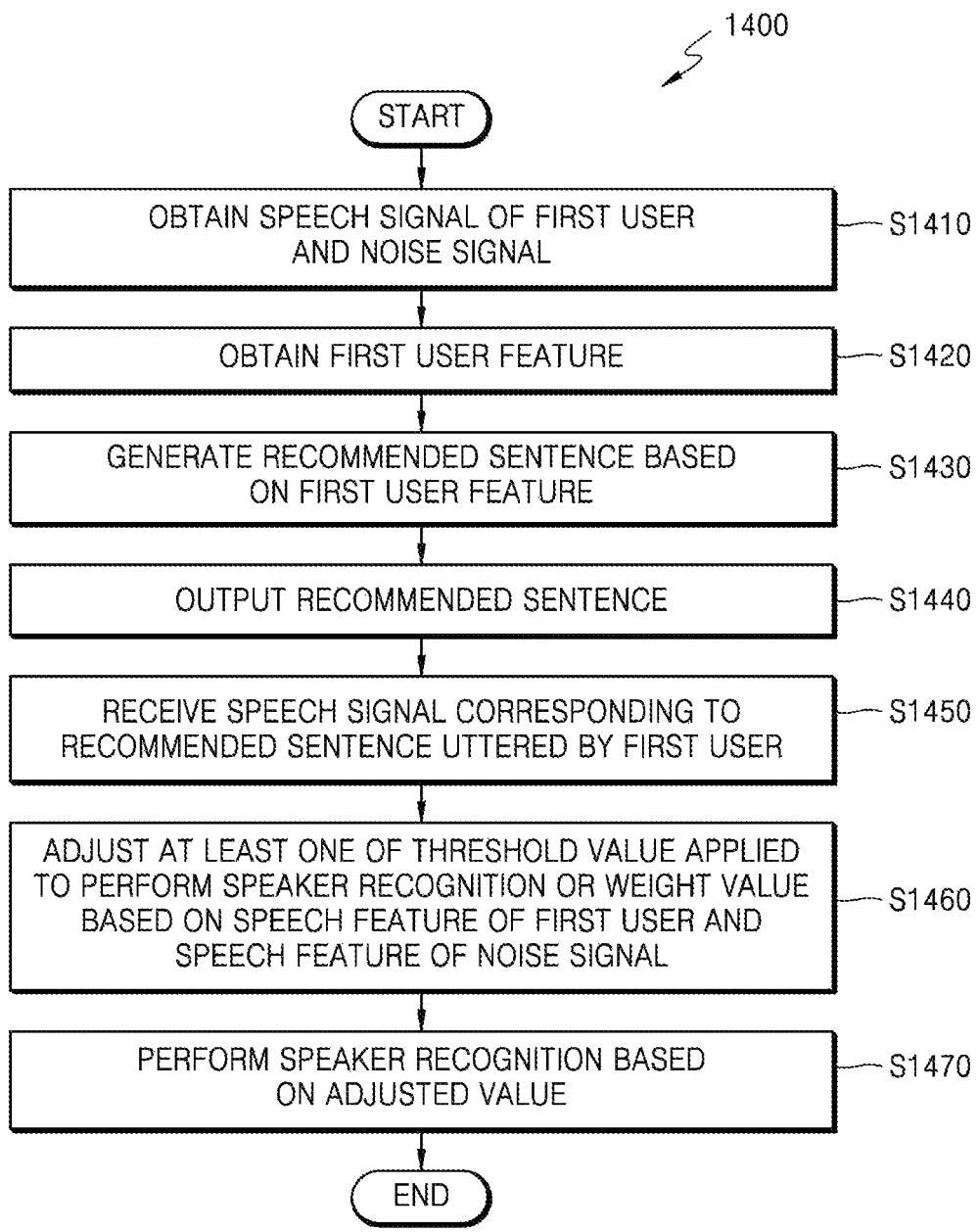
FIG. 14 is a flowchart of a method of processing a speech signal according to another embodiment of the disclosure.

FIG. 14 is a flowchart of a method of processing a speech signal according to another embodiment of the disclosure. Operations S1410, S1420, S1430, and S1440 of the method 1400 of FIG. 14 respectively correspond to operations S710, S720, S730, and S740 of FIG. 7, and thus a repeated explanation will not be given.

Referring to FIG. 14, in operation S1410, a speech signal of a first user is obtained.

In operation S1420, a speech feature extracted from the speech signal of the first user is compared with a reference value to obtain a first user feature that corresponds to the speech feature of the first user compared with the reference value.

Next, in operation S1430, a recommended sentence used for speaker recognition is generated based on the first user feature obtained in operation S1420.

In operation S1440, the recommended sentence generated in operation S1430 is output.

Next, in operation S1450, when the first user utters the recommended sentence, a registered speech signal that is a speech signal corresponding to the recommended sentence uttered by the first user may be received.

A noise signal and a pure speech signal may be included in the speech signal received in operation S1450. The 'noise signal' that is any audio signal other than speech of the first user and generated in an environment where the first user utters may include environmental noise.

In operation S1460, at least one of a threshold value applied to perform speaker recognition or a weight value may be adjusted based on the speech feature of the first user and a speech feature of the noise signal. Operation S1460 may be performed by the controller 320, and corresponds to block operation 950 based on the environmental noise of FIG. 9 and thus a detailed explanation thereof will not be given.

Next, in operation S1470, speaker recognition may be performed based on the value adjusted in operation S1460. Operation S1470 may be performed by the controller 320. In detail, operation S1460 may be performed by the speaker identification engine 930 of FIG. 9. In detail, the speaker identification engine 930 may be adjusted based on a feature of noise generated in an environment where speaker recognition is performed, and a speaker recognition operation may be performed by using the adjusted speaker identification engine 930.

A method of processing a speech signal for speaker recognition and an electronic apparatus thereof according to an embodiment of the disclosure may improve speaker recognition accuracy.

In detail, a method of processing a speech signal for speaker recognition and an electronic apparatus thereof according to an embodiment of the disclosure may improve, when speaker recognition is performed on a plurality of speakers having similar speech features, speaker recognition performance based on speech uttered by one speaker from among the plurality of speakers.

Also, a method of processing a speech signal for speaker recognition and an electronic apparatus thereof according to an embodiment of the disclosure may increase a speaker recognition rate, for example, speaker recognition accuracy, due to a noise signal generated when a speech signal is received for speaker recognition.

In detail, a method of processing a speech signal for speaker recognition and an electronic apparatus thereof according to an embodiment of the disclosure may improve speaker recognition performance by adaptively responding to a change in an operating environment and a noise environment where speaker recognition is performed.

An embodiment of the disclosure may be implemented as a recording medium including computer-executable instructions such as a program module executed by a computer. The recording medium may be non-transitory. In detail, the recording medium may be a recording medium storing a program including instructions for executing a method of processing a speech signal according to an embodiment of the disclosure.

A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes computer-readable instructions, a data structure, a program module, other data of a modulated data signal, or another transmission mechanism, and an example thereof includes an arbitrary information transmission medium. Also, an embodiment of the disclosure may be implemented as a computer program or a computer program product including an instruction executable by a computer such as a computer program executed by a computer.

The particular implementations shown and described herein are illustrative examples of the disclosure and are not intended to otherwise limit the scope of the disclosure in any way. For the sake of brevity, electronic configurations according to the related art, control systems, software development, and other functional aspects of the systems may not be described in detail.

What is claimed is:

1. A method of processing a speech signal for speaker recognition in an electronic apparatus, the method comprising:
    obtaining speech data;
    extracting one or more sound units from the speech data;
    comparing speech feature values of each of one or more sound units associated with a first user with reference user speech feature values for respective sound units corresponding to one or more other speakers, wherein the one or more sound units associated with the first user are extracted from speech uttered by the first user;
    determining whether a difference between at least one of the extracted one or more sound units associated with the first user and the respective reference user speech feature values is greater than a threshold; and
    based on determining that the difference between at least one of the extracted one or more sound units associated with the first user and the respective reference user speech feature values is greater than the threshold:
        selecting, as a user feature of the first user, a sound unit that corresponds to the one of the at least one of the extracted one or more sound units that has the difference from the reference user speech feature value that is greater than the threshold;
        generating a recommended passphrase for speaker recognition using the user feature of the first user; and
        outputting the recommended passphrase.

2. The method of claim 1,
    wherein the selecting comprises, based on a result of the comparing, selecting, as the user feature of the first user, at least one sound unit feature that is extracted from a speech signal of the first user and whose similarity to the reference user speech feature value is lower than a predetermined percentage.

3. The method of claim 1, wherein the user feature of the first user and the reference user speech feature values are phoneme contexts, and
    wherein the generating of the recommended passphrase comprises generating the recommended passphrase so that letters comprising at least one phoneme context included in the user feature of the first user are included in the recommended passphrase.

4. The method of claim 1, further comprising:
receiving the recommended passphrase from the first user; and
receiving the recommended passphrase as a registered speech signal and performing the speaker recognition by using the registered speech signal.

5. The method of claim 1, wherein the reference user speech feature values include a value representing an average speech feature of a plurality of users in a phoneme context unit.

6. The method of claim 1, wherein
the electronic apparatus is commonly used by a plurality of users including the first user, and
the reference user speech feature values include a value representing a speech feature extracted from a speech signal of a second user included in the plurality of users.

7. The method of claim 6, wherein the selecting of the user feature of the first user comprises performing a comparison to compare a speech feature of a phoneme context unit extracted from a speech signal of the first user with a speech feature of a phoneme context unit extracted from the speech signal of the second user, and
extracting, as the user feature of the first user, at least one phoneme context whose difference between the speech feature of the first user and the speech feature of the second user exceeds a predetermined range as a result of the comparison.

8. The method of claim 6, further comprising calculating a similarity between the speech feature of the first user and the speech feature of the second user; and
modifying at least one of:
the speech feature of the first user,
the speech feature of the second user,
a model used to recognize a speech signal of the first user, or
a model used to recognize the speech signal of the second user,
in order to increase discrimination power in recognizing speech of at least one of the first user or the second user.

9. The method of claim 1, wherein the obtaining of the speech signal of the first user comprises receiving a speech signal uttered by the first user and a noise signal generated in an environment where the first user utters the speech signal,
wherein the method further comprises:
extracting a noise feature that is a feature of the noise signal;
adjusting at least one of a threshold value applied to perform the speaker recognition or a weight value applied to a predetermined sound unit included in the speech signal of the first user, based on the noise feature; and
performing the speaker recognition based on the adjusted at least one of the threshold value or the weight value.

10. The method of claim 1, wherein the obtaining of the speech signal of the first user comprises:
receiving a speech signal uttered by the first user and a noise signal generated in an environment where the first user utters the speech signal,
wherein the method further comprises:
extracting a signal feature of the noise signal; and
adjusting a speaker recognition model so that the speech signal to be recognized is not masked by the noise signal, based on a noise feature that is a feature of the noise signal.

11. An electronic apparatus for processing a speech signal to perform speaker recognition, the electronic apparatus comprising:
a controller configured to:
obtain speech data;
extract one or more sound units from the speech data;
compare speech feature values of each of one or more sound units associated with a first user with reference user speech feature values for respective sound units corresponding to one or more other speakers, wherein the one or more sound units associated with the first user are extracted from speech uttered by the first user;
determine whether a difference between at least one of the extracted one or more sound units associated with the first user and the respective reference user speech feature values is greater than a threshold; and
based on determining that the difference between at least one of the extracted one or more sound units associated with the first user and the respective reference user speech feature values is greater than the threshold:
select, as a user feature of the first user, a sound unit that corresponds to the one of the at least one of the extracted one or more sound units that has the difference from the reference user speech feature value that is greater than the threshold;
generate a recommended passphrase for speaker recognition using the user feature of the first user; and
output the recommended passphrase.

12. The electronic apparatus of claim 11, wherein the controller is further configured to:
extract, as the user feature of the first user, at least one sound unit feature that is extracted from a speech signal of the first user and whose similarity to the corresponding reference user speech feature value is lower than a predetermined percentage.

13. The electronic apparatus of claim 11, wherein the user feature of the first user and the reference user speech feature values are phoneme contexts, and
wherein the controller is further configured to generate the recommended passphrase so that letters comprising at least one phoneme context included in the user feature of the first user are included in the recommended passphrase.

14. The electronic apparatus of claim 11, wherein the reference user speech feature values include a value representing an average speech feature of a plurality of users in a phoneme context unit.

15. The electronic apparatus of claim 11, wherein the electronic apparatus is configured to perform the speaker recognition on a plurality of users comprising the first user, and
wherein the reference user speech feature values include a value representing a speech feature extracted from a speech signal of a second user included in the plurality of users.

16. The electronic apparatus of claim 15, wherein the controller is further configured to:
perform a comparison to compare a speech feature of a phoneme context unit extracted from a speech signal of the first user with a speech feature of a phoneme context unit extracted from the speech signal of the second user, and
extract, as the user feature of the first user, at least one phoneme context whose difference between the speech feature of the first user and the speech feature of the second user exceeds a predetermined range as a result of the comparison.

17. The electronic apparatus of claim 11, wherein the controller is further configured to:
   receive a speech signal uttered by the first user and a noise signal generated in an environment where the first user utters the speech signal, and
   extract a signal feature of the noise signal, adjust at least one of a threshold value applied to perform the speaker recognition or a weight value applied to a predetermined sound unit included in the speech signal of the first user based on the signal feature of the noise signal, and perform the speaker recognition based on the adjusted at least one of the threshold value or the weight value.

18. A non-transitory computer-readable recording medium having embodied thereon a program comprising computer-executable instructions for performing a method of processing a speech signal for speaker recognition in an electronic apparatus, the method comprising:
   obtaining speech data;
   extracting one or more sound units from the speech data;
   comparing speech feature values of each of one or more sound units associated with a first user with reference user speech feature values for respective sound units corresponding to one or more other speakers, wherein the one or more sound units associated with the first user are extracted from speech uttered by the first user;
   determining whether a difference between at least one of the extracted one or more sound units associated with the first user and the respective reference user speech feature values is greater than a threshold; and
   based on determining that the difference between at least one of the extracted one or more sound units associated with the first user and the respective reference user speech feature values is greater than the threshold:
      selecting, as a user feature of the first user, a sound unit that corresponds to the one of the at least one of the extracted one or more sound units that has the difference from the reference user speech feature value that is greater than the threshold;
      generating a recommended passphrase for speaker recognition using the user feature of the first user; and
      outputting the recommended passphrase.

* * * * *